(12) United States Patent
Murashige et al.

(10) Patent No.: US 8,358,578 B2
(45) Date of Patent: Jan. 22, 2013

(54) REDUNDANT COMMUNICATION SYSTEM

(75) Inventors: Seigo Murashige, Utsunomiya (JP);
Hiroyuki Abe, Utsunomiya (JP);
Junichi Kobayashi, Tokyo (JP);
Takashi Majima, Yokohama (JP); Yuji Sasaki, Yokohama (JP)

(73) Assignees: Honda Motor Co., Ltd., Tokyo (JP);
IHI Corporation, Tokyo (JP)

( * ) Notice: Subject to any disclaimer, the term of this patent is extended or adjusted under 35 U.S.C. 154(b) by 407 days.

(21) Appl. No.: 12/810,437

(22) PCT Filed: Dec. 25, 2008

(86) PCT No.: PCT/JP2008/073607
§ 371 (c)(1),
(2), (4) Date: Jun. 24, 2010

(87) PCT Pub. No.: WO2009/081982
PCT Pub. Date: Jul. 2, 2009

(65) Prior Publication Data
US 2010/0280634 A1    Nov. 4, 2010

(30) Foreign Application Priority Data
Dec. 26, 2007   (JP) .................................. 2007-334101

(51) Int. Cl.
*G01R 31/08*    (2006.01)
*G06F 11/00*    (2006.01)

(52) U.S. Cl. ........ 370/225; 370/252; 370/331; 370/351; 370/395.32

(58) Field of Classification Search .................. None
See application file for complete search history.

(56) References Cited

U.S. PATENT DOCUMENTS 6,859,708 B2 *   2/2005   Hashimoto et al. ............. 701/48
7,130,728 B2 *  10/2006   Suzuki ............................. 701/41

(Continued)

FOREIGN PATENT DOCUMENTS

| CN | 1550087 | 11/2004 |
|---|---|---|
| JP | 07-075141 A | 3/1995 |

(Continued)

OTHER PUBLICATIONS

Supplemental European Search Report for Application No. 08864991.8, dated Apr. 28, 2011.

(Continued)

*Primary Examiner* — Chirag Shah
*Assistant Examiner* — Ashley Shivers
(74) *Attorney, Agent, or Firm* — Nelson Mullins Riley & Scarborough LLP; Anthony A. Laurentano

(57) ABSTRACT

A redundant communication system includes a first control device which calculates a control command value of an electric power device, and outputs first and second command signals; a second control device which controls the electric power device on the basis of one of the first and second control command values; and primary and secondary communication lines for respectively transmitting the first and second command signals to the second control device. The second control device comprises: a primary communication line abnormality determining unit which determines that the primary communication line is abnormal when a non-reception state or an abnormality state of the first command signal continues during a predetermined period; and a control command value switching unit which selects one of the first and second control command values in a switching manner and switches the selection from the first to the second control command value within the predetermined period.

8 Claims, 17 Drawing Sheets

U.S. PATENT DOCUMENTS

| | | | |
|---|---|---|---|
| 7,165,646 B2 * | 1/2007 | Kifuku et al. | 180/446 |
| 7,322,439 B2 * | 1/2008 | Hara et al. | 180/402 |
| 2008/0002571 A1 * | 1/2008 | Maeda et al. | 370/225 |

FOREIGN PATENT DOCUMENTS

| | | |
|---|---|---|
| JP | 9-46767 | 2/1997 |
| JP | 11-112643 A | 4/1999 |
| JP | 11-203172 | 7/1999 |
| JP | 2000-244520 | 9/2000 |
| JP | 2000-341198 A | 12/2000 |
| JP | 2002-252553 | 9/2002 |
| JP | 2005-252553 | 9/2002 |
| JP | 2004-173371 | 6/2004 |
| JP | 2004-336907 | 11/2004 |
| WO | 2007/080741 A1 | 7/2007 |

OTHER PUBLICATIONS

Japanese Office Action for Application No. 2007-334101, dated Nov. 29, 2011.

Chinese Office Action for Application No. 200880122892.5, 9 pages, dated Mar. 2, 2012.

International Search Report for Application No. PCT/JP2008/073607, dated Jan. 27, 2009.

* cited by examiner

REDUNDANT COMMUNICATION SYSTEM

TECHNICAL FIELD

The present invention relates to a redundant communication system.

This application is a 35 U.S.C. 371 national stage filing of International Application No. PCT/JP2008/073607, filed Dec. 28, 2008, which claims priority to Japanese Patent Application No. 2007-334101, filed on Dec. 26, 2007, in Japan. The contents of the aforementioned applications are incorporated herein by reference.

BACKGROUND ART

In the past, as a motor control device which controls drive of a motor equipped in an electric power steering apparatus of a vehicle, there is known a motor control device having a configuration in which a first processing device calculating a motor command value and a second processing device controlling a motor in accordance with the motor command value are connected to each other through a serial communication line or an analog communication line (for example, see Patent Document 1). The motor control device controls the drive of the motor in accordance with the motor command value transmitted and received through the analog communication line, when an abnormality occurs in the serial communication line.

[Patent Document 1] Japanese Unexamined Patent Application, First Publication No. 2004-173371

DISCLOSURE OF THE INVENTION

Problem that the Invention is to Solve

However, the motor control device according to the example of the above related art needs to be improved in reliability of a determination result by more precisely making a determination of determining whether the abnormality occurs in the serial communication line. The drive of the motor needs to be properly controlled by controlling with more detail a time at which a determination process is executed and a time at which the communication line is switched.

The invention is made in view of the above-mentioned circumstance and an object of the present invention is to provide a redundant communication system capable of precisely controlling a power device equipped in a vehicle, even when an abnormality occurs in a communication system of the vehicle.

Means for Solving the Problem

In order to solve the above-mentioned problem and achieve the object of the present invention, a redundant communication system according to the present invention includes: a first control device which calculates a control command value of an electric power device equipped in a vehicle, and outputs a first command signal and a second command signal respectively corresponding to the control command value; a second control device which controls the electric power device on the basis of one of a first control command value and a second control command value respectively corresponding to the first command signal and the second command signal received from the first control device; a primary communication line which connects the first control device and the second control device, and transmits the first command signal from the first control device to the second control device; and a secondary communication line which connects the first control device and the second control device, and transmits the second command signal from the first control device to the second control device, wherein the second control device comprises: a primary communication line abnormality determining unit which determines that the primary communication line is abnormal, when a non-reception state of the first command signal or an abnormality state of the first command signal continues during a predetermined period; and a control command value switching unit which selects one of the first control command value and the second control command value in a switching manner, and wherein the control command value switching unit switches the selection from the first control command value to the second control command value within the predetermined period from a start time at which the non-reception state of the first command signal or the abnormality state of the first command signal starts until a time at which the primary communication line abnormality determining unit determines that the primary communication line is abnormal.

The control command value switching unit may switch the selection from the second control command value to the first control command value, when the non-reception state of the first command signal or the abnormality state of the first command signal is dissolved after switching from the first control command value to the second control command value and before elapse of the predetermined period.

The second control device may control the electric power device on the basis of the first control command value selected immediately before the start time at which the non-reception state of the first command signal or the abnormality state of the first command signal starts, from the start time until the time at which the control command value switching unit switches the selection from the first control command value to the second control command value.

The second control device may further includes: a storage unit which stores a difference between the first control command value and the second control command value; and a correction unit which corrects the control command value selected between the first control command value and the second control command value by switching of the control command value switching unit, on the basis of the difference stored in the storage unit.

Communications through the primary communication line and the secondary communication line are carried out in different communication protocols.

The second control command value may be a PWM signal, the second control device may include a noise filter unit reducing noise of the PWM signal, a Schmitt trigger, and a low-pass filter disposed between the first control device and the control command value switching unit, and the PWM signal may be transmitted from the first control device to the noise filter, the Schmitt trigger, and the low-pass filter in sequence.

The noise filter unit may include a common mode filter and a transistor.

The second control device may include a photo-coupler disposed between the noise filer unit and the Schmitt trigger.

The second control device may include a buffer amplifier disposed between the low-pass filter and the control command value switching unit.

ADVANTAGE OF THE INVENTION

In the redundant communication system according to the present invention, the first control command value which is based on the first command signal can be switched to the second control command value which is based on the second command signal even after time at which there is a possibility of determining that the primary communication line is abnormal when the non-reception state of the first command or the abnormality state of the first control command value starts, even before time at which it is determined that the primary communication line is actually abnormal. With such a configuration, it is possible to properly control the power device in accordance with the control command value calculated by the first control device, even while the process of determining that the primary communication line is abnormal is performed.

Even though the first control command value is switched to the second control command value in association with a possibility of determining that an abnormality occurs in the primary communication line, the second control command value can again be switched to the first control command value, when the possibility of determining that the abnormality occurs in the primary communication line dissolves in association with resolution of the non-reception state of the first control command signal or resolution of the abnormality of the first control command value. In this way, it is possible to improve precision in control of the power device in accordance with the control command value, when the primary communication line is better in a communication throughput and a communication rate than the secondary communication line, for example.

It is possible to continue proper control of the power device without using the control command value having a possibility that an abnormality occurs, during the period from time at which a possibility of determining that an abnormality occurs in the primary communication line occurs at the time of starting the non-reception state of the first command signal or the abnormality state of the first control command value until time at which the first control command value is actually switched to the second control command value.

Even though the difference between the first control command value and the second control command value is present, it is possible to smoothly vary the control command value before and after the switch from the first control command value to the second control command value, by correcting the second command value so as to approach the first control command value, for example. In this way, abrupt change in the control of the power device can be prevented.

Since communication is carried out through the primary communication line and the secondary communication line in the different communication protocols, it is possible to properly control the power device, while improving a complementary property in communication of the primary communication line and the secondary communication line, compared to a case where communication is carried out through communication lines in the same communication protocol, for example.

Since the PWM signal is transmitted through the noise filter unit, the Schmitt trigger, and the low-pass filter in sequence, the PWM signal having reduced noise and good precision can be input to the low-pass filter. Accordingly, the low-pass filter can properly convert the PWM signal and output the precisely converted PWM signal. In this way, it is possible to properly control the power device on the basis of the PWM signal.

By providing both the common mode filter and the transistor in the noise filter unit, it is possible to precisely suppress both common mode noise and normal mode noise. Accordingly, the PWM signal having good precision can be transmitted.

By providing the photo-coupler, it is possible to precisely convert the PWM signal and further reduce noise.

Moreover, by providing the transistor to an input-side of the photo-coupler, it is possible to prevent breakdown of the photo-coupler. That is, in a case where the transistor is not provided, for example, a problem may occur in that the photo-coupler breaks down when relatively large noise is input, thereby not transmitting the PWM signal. However, by providing the transistor, this problem can be prevented. Accordingly, since the PWM signal can be more precisely transmitted, it is possible to prevent abnormality of the PWM signal from occurring.

The current of the PWM signal output from the low-pass filter is amplified by the buffer amplifier. That is, since impedance (resistance) is reduced in the buffer amplifier, it is possible to improve precision of the control of the power device on the basis of the PWM signal thanks to an increase in the current of the PWM signal.

DESCRIPTION OF REFERENCE NUMERALS

1: FUEL CELL VEHICLE (VEHICLE)
1a: CONTROL DEVICE
10: REDUNDANT COMMUNICATION SYSTEM
11: MOTOR POWER DRIVE UNIT (MOTPDU)
12: FC STACK
13: ANODE GAS SUPPLY SYSTEM
14: AIR PUMP (A/P) (POWER DEVICE)
15: HIGH-TENSION BATTERY
16: ELECTRIC POWER DISTRIBUTION DEVICE
17: MOTOR
21: INTEGRATION (CORPORATION) CONTROL ECU (FIRST CONTROL DEVICE)
22: AIR SUPPLY CONTROL ECU (SECOND CONTROL DEVICE)
61: CAN COMMUNICATION LINE (PRIMARY COMMUNICATION LINE)
62: PWM SIGNAL LINE (SECONDARY COMMUNICATION LINE)
82: CAN COMMUNICATION INPUT PROCESSOR (PRIMARY COMMUNICATION LINE ABNORMALITY DETERMINING UNIT)
83a: NOISE FILTER UNIT
83b: COMMON MODE FILTER
83c: TRANSISTOR
83d: PHOTO-COUPLER
83e: SCHMITT TRIGGER
83f: LOW-PASS FILTER
83g: BUFFER AMPLIFIER
85: CONTROL COMMAND VALUE STORAGE UNIT (STORAGE UNIT)
86: SWITCH PROCESSOR (CONTROL COMMAND VALUE SWITCHING UNIT)
87: CONTROL COMMAND VALUE OUTPUT UNIT (CORRECTION UNIT)

BEST MODE FOR CARRYING OUT THE INVENTION

Hereinafter, a redundant communication system will be described with reference to the accompanying drawings according to an embodiment of the present invention.

Figure 1:
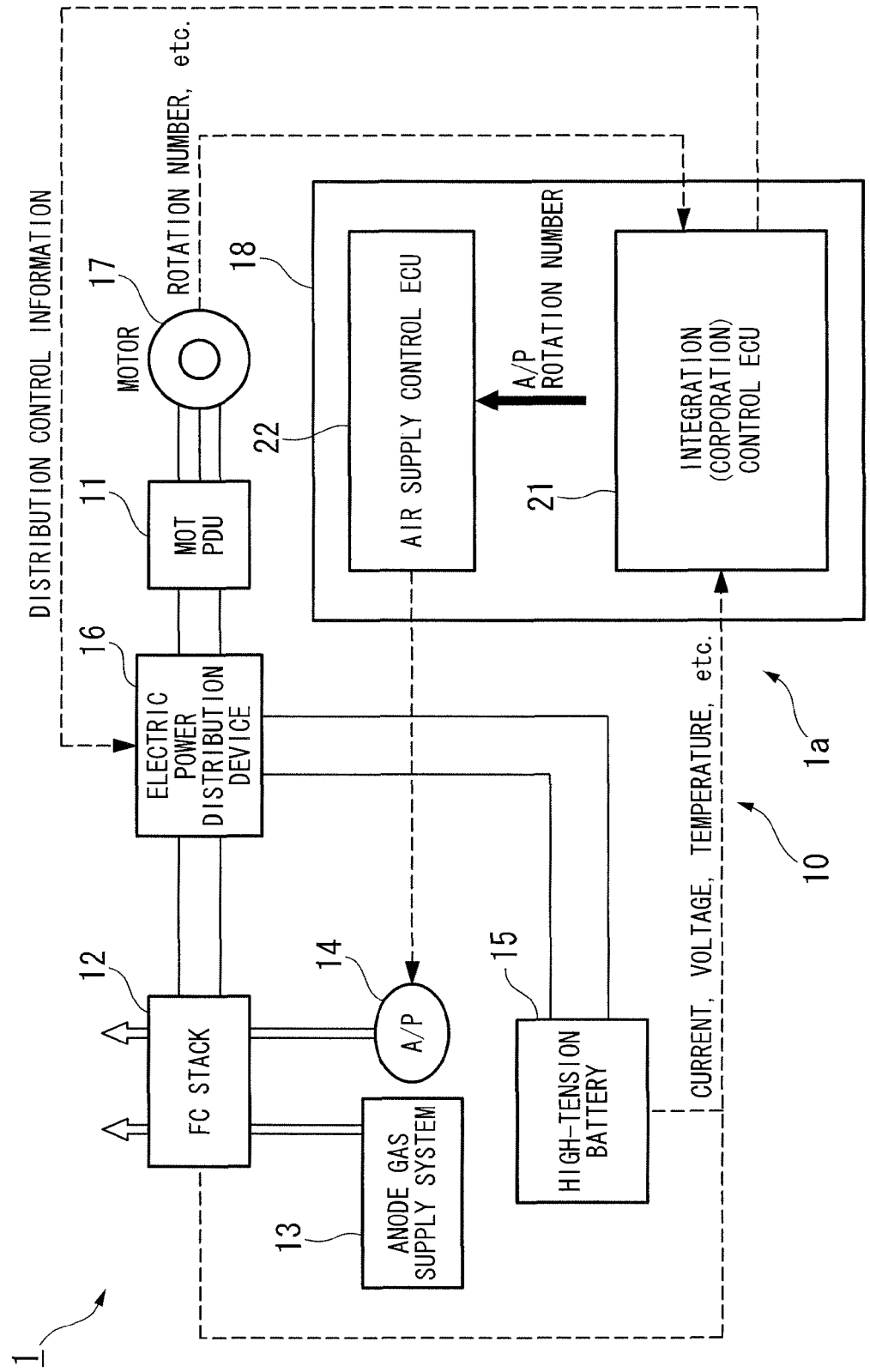
FIG. 1 is a diagram illustrating the configuration of a fuel cell vehicle according to an embodiment of the present invention.

A redundant communication system 10 according to this embodiment is equipped in a fuel cell vehicle 1 shown in FIG. 1. The fuel cell vehicle 1 includes an FC stack 12, an anode gas supply system 13, an air pump (A/P) 14, a high-tension battery 15, and an electric power distribution device 16, which are power supply units supplying power to a motor power drive (MOTPDU) 11. The electric power distribution device 16 connected in parallel to the FC (fuel cell) stack 12 and the high-tension battery 15 is connected in parallel to the motor power drive unit (MOTPDU) 11. A drive force of a driving motor 17 which is driven by the motor power drive unit (MOTPDU) 11 is transmitted to a driving wheel W through a decelerator (not shown). A drive force is transmitted from the driving wheel W to the motor 17 while reducing the speed of the fuel cell vehicle 1, thereby the motor 17 functioning as an electric generator generates so-called regeneration braking force to recover motional energy of the vehicle as electric energy.

A control device 1a of the fuel cell vehicle 1 includes the motor power drive unit (MOTPDU) 11, the anode gas supply system 13, the air pump (A/P) 14, the electric power distribution device 16, and an ECU 18.

The ECU 18 includes an integration (corporation) control ECU 21 as a so-called server device and an air supply control ECU 22 as a so-called client device.

The driving motor 17 which includes a permanent magnet three-phase AC synchronous motor is drive-controlled by three-phase AC power supplied from the motor power drive unit (MOTPDU) 11.

The motor power drive unit (MOTPDU) 11 includes a PWM inverter constituted by a switching element of a transistor, for example, and converts DC power output from the electric power distribution device 16 into three-phase AC power to supply the converted three-phase AC power to the motor 17.

In the FC (Fuel Cell) stack 12, plural cells formed by interposing a solid polymer electrolyte membrane formed of a solid polymer ion-exchange membrane and the like between both anode and cathode are laminated. The FC (Fuel Cell) stack 12 includes a fuel electrode to which an anode gas such as a hydrogen gas is supplied as fuel and an air electrode to which air containing oxygen as oxidant is supplied. Hydrogen ions generated by catalytic reaction to anode move to cathode through a solid polymer electrolyte membrane and cause electrochemical reaction with oxygen in cathode, thereby producing electricity.

The anode gas supply system 13 supplies an anode gas such as a hydrogen gas to the fuel electrode of the FC (Fuel Cell) stack 12.

The air pump (A/P) 14 supplies air to the air electrode of the FC (Fuel Cell) stack 12 on the basis of a control command output from the air supply control ECU 22.

The high-tension battery 15 is formed of a lithium ion battery or a nickel hydride (Ni-MH) battery, for example.

The electric power distribution device 16 includes a high-tension distributor and controls power exchange between the motor power drive unit (MOTPDU) 11 and the high-tension battery 15 and distribution of the power output from the FC (Fuel Cell) stack 12 to the motor power drive unit (MOTPDU) 11 and the high-tension battery 15 on the basis of distribution control information output from the integration (corporation) control ECU 21.

The integration (corporation) control ECU 21 of the ECU 18 outputs a control command value (A/P rotation number) for the number of rotation of the air pump (A/P) 14 as a control command for controlling an operation of the air supply control ECU 22 and outputs the distribution control information used to control the electric power distribution device 16.

A detection signal output from a sensor (not shown) detecting a state amount (for example, the rotation number) of the driving motor 17, a detection signal output from a sensor (not shown) detecting a state amount (for example, current, voltage, and temperature) of the FC (Fuel Cell) stack 12, and a detection signal output from a sensor (not shown) detecting a state amount (for example, current, voltage, and temperature and state amount necessary to calculate a remaining volume SOC) of the high-tension battery 15 are input to the integration (corporation) control ECU 21. The integration (corporation) control ECU 21 calculates the control command value (A/P rotation number) and the distribution control information, for example, on the basis of the detection signals.

Figure 2:
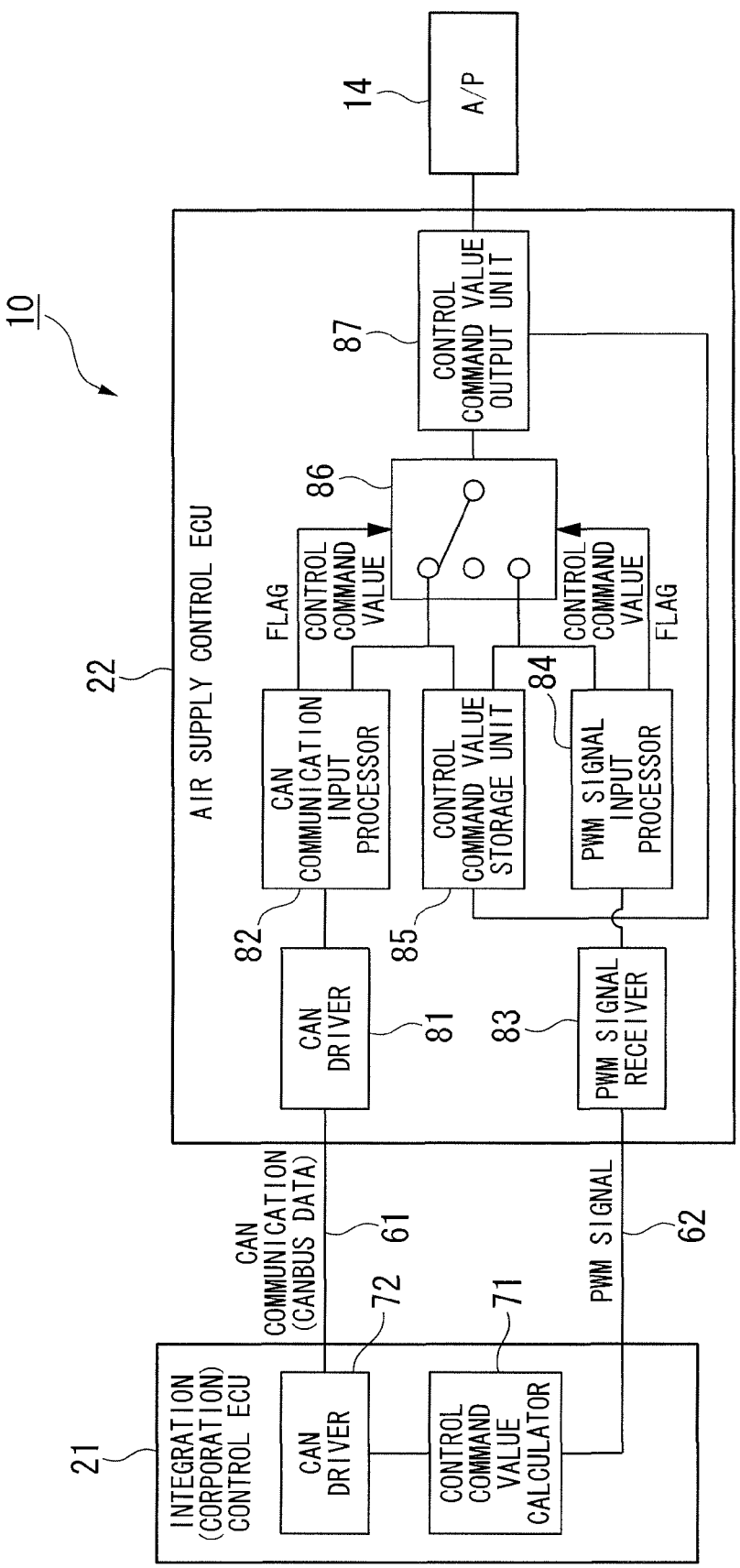
FIG. 2 is a diagram illustrating the configuration of a redundant communication system according to the embodiment.

The redundant communication system 10 according to this embodiment includes the integration (corporation) control ECU 21 and the air supply control ECU 22, as shown in FIG. 2. The integration (corporation) control ECU 21 and the air supply control ECU 22 are connected to each other by a CAN (Controller Area Network) communication line 61 for digital communication and a PWM signal line 62 for analog communication, for example.

The integration (corporation) control ECU 21 includes a control command value calculator 71 and a CAN driver 72 of a CAN protocol, for example.

The air supply control ECU 22 includes a CAN driver 81 for a CAN protocol, a CAN communication input processor 82, a PWM signal receiver 83, a PWM signal input processor 84, a control command value storage unit 85, a switch processor 86, and a control command value output unit 87.

The CAN driver 72 of the integration (corporation) control ECU 21 and the CAN driver 81 of the air supply control ECU 22 are connected to each other by the CAN communication line 61. The control command value calculator 71 of the integration (corporation) control ECU 21 and the PWM signal receiver 83 of the air supply control ECU 22 are connected to each other by the PWM signal line 62.

The control command value calculator 71 of the integration (corporation) control ECU 21 calculates the control command value (A/P rotation number) for the number of rotations of the air pump (A/P) 14 as a control command value to be output to the air supply control ECU 22, for example. In addition, the control command value calculator 71 outputs command values (that is, CANBUS data for the CAN communication line 61 and the PWM signal for the PWM signal line 62) obtained by appropriately converting the control command values (A/P rotation number) in correspondence with the CAN communication line 61 and the PWM signal line 62. That is, the CANBUS data is output to the CAN driver 81 of the air supply control ECU 22 through the CAN driver 72 and the CAN communication line 61. The PWM signal is output to the PWM signal receiver 83 of the air supply control ECU 22 through the PWM signal line 62.

The CAN driver 81 of the air supply control ECU 22 converts the CANBUS data as the command signal input from the integration (corporation) control ECU 21 into an A/P rotation number command (CAN reception value). The A/P rotation number command (CAN reception value) is output to the CAN communication input processor 82.

The CAN communication input processor 82 sets flag values of various flags such as a CAN reception abnormality flag representing that an abnormality occurs in receiving the CANBUS data associated with the A/P rotation number command (CAN reception value) through the CAN communication line 61 or a CAN reception abnormality flag representing that an abnormality occurs in the CAN communication line 61, in accordance with a reception state or a non-reception state of the CANBUS data associated with the A/P rotation number command (CAN reception value) input from the CAN driver 81 or the CANBUS data associated with the A/P rotation number command (CAN reception value) input through the CAN communication line 61. In addition, the CAN communication input processor 82 appropriately changes the A/P rotation number command (CAN reception value) according to the CANBUS data from a present value to the previous value or a predetermined value, for example, if necessary. In addition, the CAN communication input processor 82 outputs the A/P rotation number command (CAN reception value) to the control command value storage unit 85 and the switch processor 86 and also outputs the CAN reception abnormality flag to the switch processor 86.

The PWM signal receiver 83 converts the PWM signal as the command signal input from the integration (corporation) control ECU 21 into the A/P rotation number command (PWM signal) and outputs the A/P rotation number command (PWM signal) to the PWM signal input processor 84.

Figure 3:
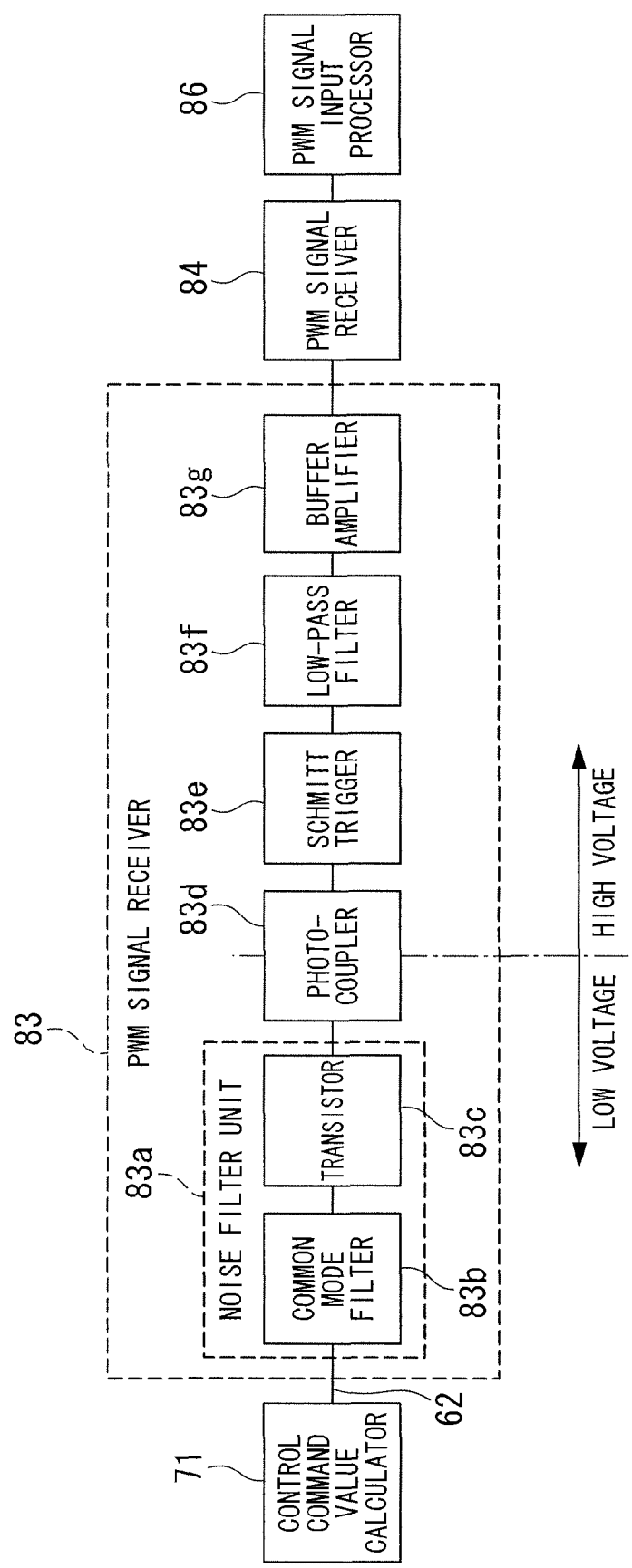
FIG. 3 is a diagram illustrating the configuration of a PWM signal receiver in FIG. 2.

The PWM signal receiver 83 is provided between the control command value calculator 71 and the PWM signal input processor 84, for example, as shown in FIG. 3. The PWM signal receiver 83 includes a noise filter unit 83a having a common mode filter 83b and a transistor 83c, a photo-coupler 83d, a Schmitt trigger 83e, a low-pass filter 83f, and a buffer amplifier 83g.

The common mode filter 83b, the transistor 83c, the photo-coupler 83d, the Schmitt trigger 83e, the low-pass filter 83f, and the buffer amplifier 83g are disposed in sequence from the control command value calculator 71 to the PWM signal input processor 84. That is, the PWM signal transmitted from the control command value calculator 71 is transmitted to the PWM signal input processor 84 and the switch processor 86 in sequence through the common mode filter 83b, the transistor 83c, the photo-coupler 83d, the Schmitt trigger 83e, the low-pass filter 83f, and the buffer amplifier 83g.

The noise filter unit 83a may have one of the common mode filter 83b and the transistor 83c, but can further reduce noise, when the noise filter unit 83*a* has both the common mode filter 83*b* and the transistor 83*c*.

In this embodiment, the photo-coupler 83*d* forms a boundary between a low voltage area where voltage is set to be low and a high voltage area where voltage is set to be higher than the low voltage area.

The integration (corporation) control ECU 21 including the control command value calculator 71, the common mode filter 83*b*, the transistor 83*c*, and the like belong to the low voltage area. On the other hand, the Schmitt trigger 83*e*, the low-pass filter 83*f*, the buffer amplifier 83*g*, the PWM signal input processor 84, the switch processor 86, and the like belong to the high voltage area. That is, the voltage of the PWM signal is low in the common mode filter 83*b* and the transistor 83*c*, but is high in the Schmitt trigger 83*e*, the low-pass filter 83*f*, and the buffer amplifier 83*g*.

The voltage of the low voltage area is the voltage of a control power source and the voltage of the high voltage area is the voltage of a fuel cell.

In the PWM signal receiver 83, a signal is processed as follows.

That is, when the PWM signal is transmitted from the control command value calculator 71, common mode noise contained in the PWM signal is first reduced by the common mode filter 83*b*.

Next, normal mode noise contained in the PWM signal is reduced by the transistor 83*c*. In this way, the PWM signal of which the common mode noise and the normal mode noise are reduced is transmitted in an optical manner in a state where the PWM signal is electrically insulated in the photo-coupler 83*d*. In addition, the photo-coupler 83*d* has a configuration in which it is difficult for noise to be transferred, the normal mode noise contained in the PWM signal is further reduced even in the photo-coupler 83*d*.

The PWM signal transmitted from the photo-coupler 83*d* is made to become a proper signal (which is in a state where "rounding" is reduced) having a higher precision, by passing the PWM signal through the Schmitt trigger 83*e*.

Subsequently, the PWM signal is converted from a rectangular phase (pulse phase) signal to a continuous signal by the low-pass filter 83*f*. Specifically, for example, the PWM signal is converted so that the voltage output from the low-pass filter 83*f* is higher, as the pulse width of the PWM signal input to the low-pass filer 83*f* is larger.

Subsequently, the current of the signal output from the low-pass filter 83*f* is amplified by the buffer amplifier 83*e*. That is, when output impedance (resistance) is reduced in the buffer amplifier 83*e*, the current of the signal increases.

The PWM signal input processor 84 sets flag values of various flags such as a PWM signal abnormality occurrence flag representing that an abnormality occurs in receiving the PWM signal associated with the A/P rotation number command (PWM signal) input through the PWM signal line 62 or a PWM signal abnormality flag representing that the PWM signal line 62 is abnormal, in accordance with a duty (DUTY: a ratio of ON/OFF states when a switching element included in a driver (not shown) driving a motor (not shown) of the air pump (A/P) 14 by pulse width modulation in accordance with the PWM signal is driven by ON/OFF operations) of the PWM signal associated with the A/P rotation number command (PWM signal) input from the PWM signal receiver 83. The PWM signal input processor 84 appropriately changes the A/P rotation number command (PWM signal) according to the PWM signal from a present value to a previous value or a predetermined value (such as zero), for example, if necessary. The PWM signal input processor 84 outputs the A/P rotation number command (PWM signal) to the control command value storage unit 85 and the switch processor 86 and also outputs the PWM signal abnormality flag to the switch processor 86.

The control command value storage unit 85 stores time-series data formed during a predetermined previous period among data of a difference between the A/P rotation number command (CAN reception value) input from the CAN communication input processor 82 and the A/P rotation number command (PWM signal) input from the PWM signal input processor 84.

The switch processor 86 switches and selects the A/P rotation number command (CAN reception value) input from the CAN communication input processor 82 and the A/P rotation number command (PWM signal) input from the PWM signal input processor 84 in accordance with the flag values of the various flags input from the CAN communication input processor 82 and the PWM signal input processor 84, and outputs them to the control command value output unit 87.

The control command value output unit 87 sets correction coefficients for the A/P rotation number command (CAN reception value) input from the switch processor 86 and the A/P rotation number command (PWM signal) input from the PWM signal input processor 84, on the basis of previous time-series data (for example, previous data of a predetermined number) of the A/P rotation number command (CAN reception value) and the A/P rotation number command (PWM signal) which are stored in the control command value storage unit 85. The control command value output unit 87 outputs an A/P rotation number command (APPDU control value) obtained by applying the correction coefficient to the A/P rotation number command (CAN reception value) or the A/P rotation number command (PWM signal) to a driver (for example, a PWM inverter or the like) which drives the motor (not shown) of the air pump (A/P) 14 in accordance with the PWM signal.

The redundant communication system 10 according to this embodiment has the configuration described above.

Next, processes of the redundant communication system 10 will be described with reference to the accompanying drawings.

In addition, a switching process between an input process (CAN communication) described below and an input process (the PWM signal) is repeatedly performed independently at a predetermined period.

Hereinafter, the input process (CAN communication) will be described.

Figure 4:
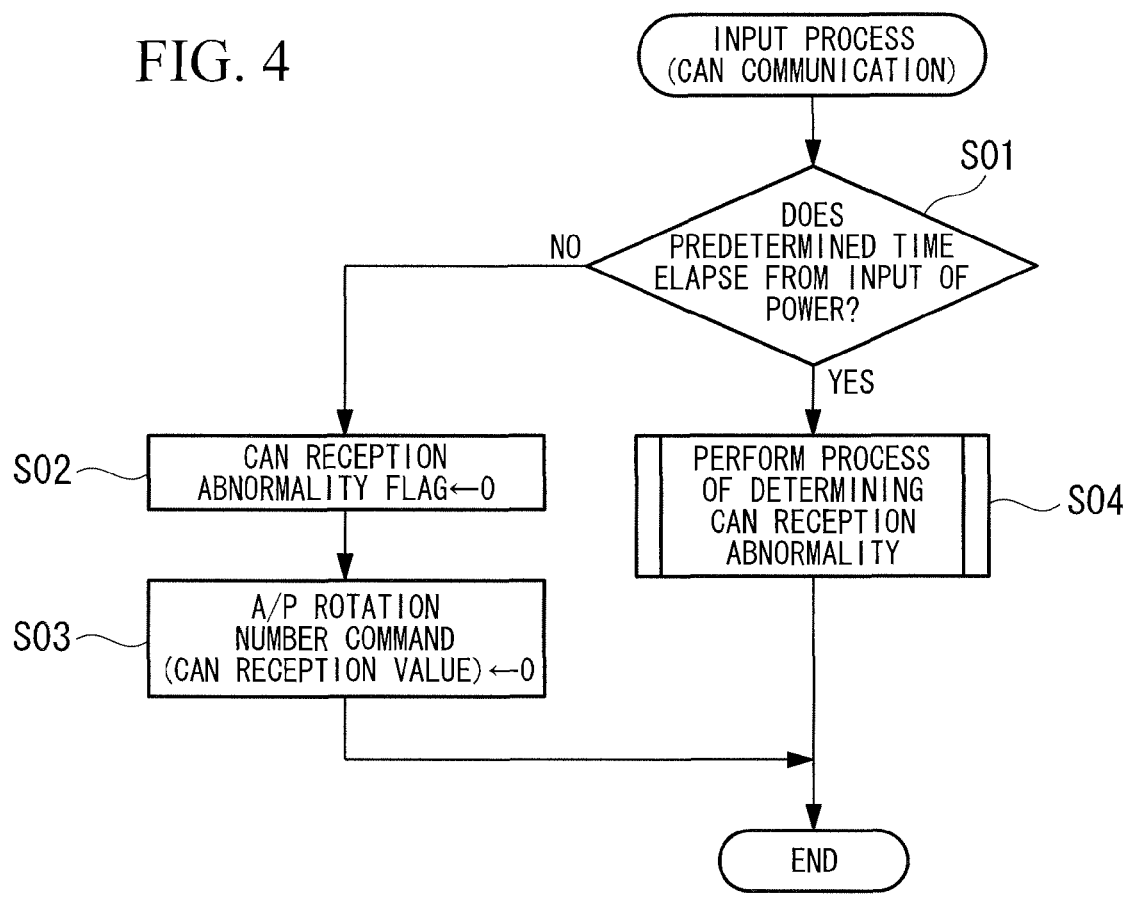
FIG. 4 is a flowchart illustrating an input process (CAN communication) according to the embodiment.

First, in Step S01 shown in FIG. 4, for example, it is determined whether a predetermined amount of time elapses from power activation time at which the control device 1*a* starts to be turned on, such as time at which the fuel cell vehicle 1 starts.

When the determination result is "YES", the process proceeds to Step S04 described below.

Alternatively, when the determination result is "NO", the process proceeds to Step S02.

In Step S02, in order to perform initialization, "0" is set to the flag value of the CAN reception abnormality flag representing that the CAN communication line 61 is abnormal, and then the process proceeds to Step S03.

In Step S03, in order to perform initialization, zero is set to the A/P rotation number command (CAN reception value), and the series of processes ends.

In Step S04, a process of determining the CAN reception abnormality, which is described below, is performed, and the series of processes ends.

Hereinafter, the process of determining the CAN reception abnormality in Step S04 will be described.

Figure 5:
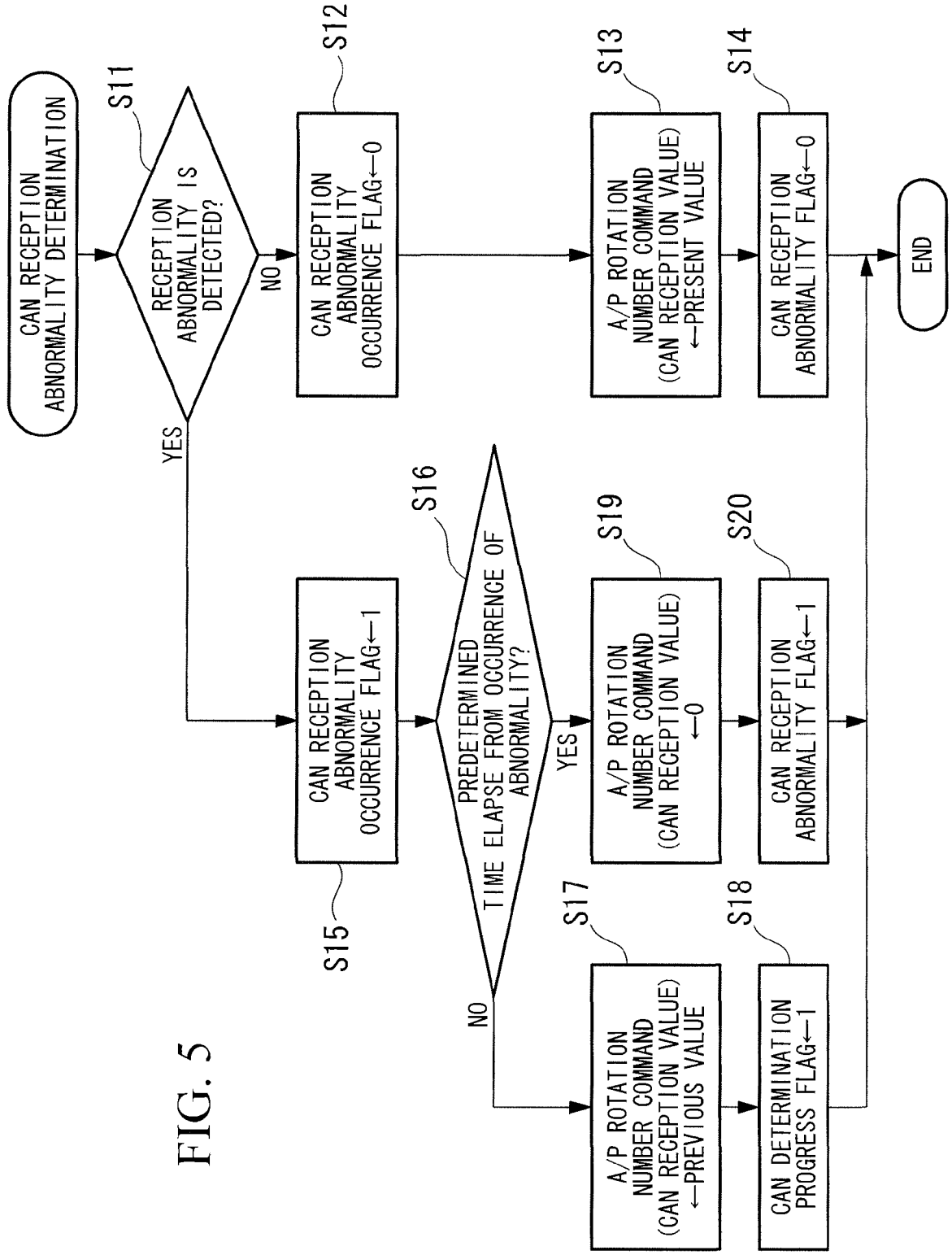
FIG. 5 is a flowchart illustrating a process of determining a CAN reception abnormality according to the embodiment.

First, in Step S11 shown in FIG. 5, for example, it is determined whether reception abnormality is detected by use of ring counter or checksum.

When the determination result is "YES", the process proceeds to Step S15 described below.

Alternatively, when the determination result is "NO", the process proceeds to Step S12.

In Step S12, "0" is set to the flag value of the CAN reception abnormality occurrence flag representing that an abnormality occurs in the CANBUS data associated with the A/P rotation number command (CAN reception value) through the CAN communication line 61, and then the process proceeds to Step S13.

In Step S13, a present value of the A/P rotation number command (CAN reception value) obtained by the CANBUS data received from the integration (corporation) control ECU 21 through the CAN communication line 61 is set as a new A/P rotation number command (CAN reception value) in this process, and then the process proceeds to Step S14.

In Step S14, "0" is set to the flag value of the CAN reception abnormality flag representing that an abnormality occurs in the CAN communication line 61, and then the series of processes ends.

In Step S15, "1" is set to the flag value of the CAN reception abnormality flag, and then the process proceeds to Step S16.

In Step S16, it is determined whether or not a predetermined amount of time elapses after occurrence of the reception abnormality in a state where the abnormality continues.

When the determination result is "YES", the process proceeds to Step S19 described below.

Alternatively, when the determination result is "NO", the process proceeds to Step S17.

In Step S17, the previous value of the A/P rotation number command (CAN reception value) obtained by the CANBUS data received from the integration (corporation) control ECU 21 through the CAN communication line 61 in the previous process is set as a new A/P rotation number command (CAN reception value), and then the process proceeds to Step S18.

In Step S18, "1" is set to the flag value of a CAN determination progress flag representing that the process of determining whether abnormality occurs in the CAN communication line 61, and the series of processes ends.

Subsequently, in Step S19, zero is set to the A/P rotation number command (CAN reception value), and then the process proceeds to Step S20.

In Step S20, "1" is set to the flag value of the CAN reception abnormality flag and the series of processes ends.

Hereinafter, the input process (PWM signal) will be described.

Figure 6:
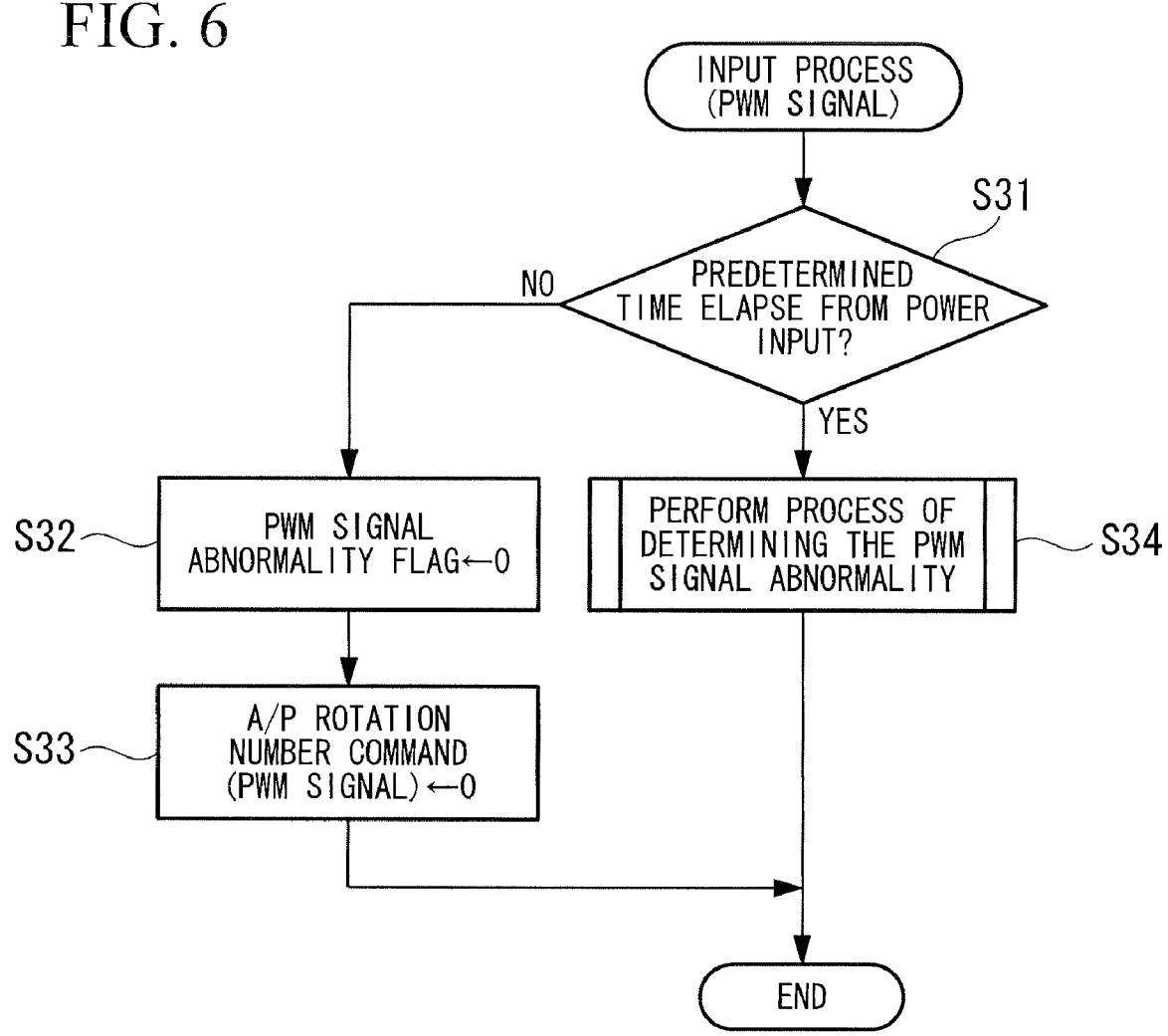
FIG. 6 is a flowchart illustrating an input process (PWM signal) according to the embodiment.

First, in Step S31 shown in FIG. 6, for example, it is determined whether or not a predetermined amount of time elapses from power activation time at which the control device 1a starts to be turned on, such as time at which the fuel cell vehicle 1 starts.

When the determination result is "YES", the process proceeds to Step S34 described below.

Alternatively, when the determination result is "NO", the process proceeds to Step S32.

In Step S32, in order to perform initialization, "0" is set to the flag value of the PWM signal abnormality flag representing that the PWM signal line 62 is abnormal, and then the process proceeds to Step S33.

In Step S33, in order to perform initialization, zero is set to the A/P rotation number command (PWM signal), and the series of processes ends.

In Step S34, a process of determining the PWM signal, which is described below, is performed, and the series of processes ends.

Hereinafter, the process of determining the PWM signal abnormality in Step S34 will be described.

Figure 7:
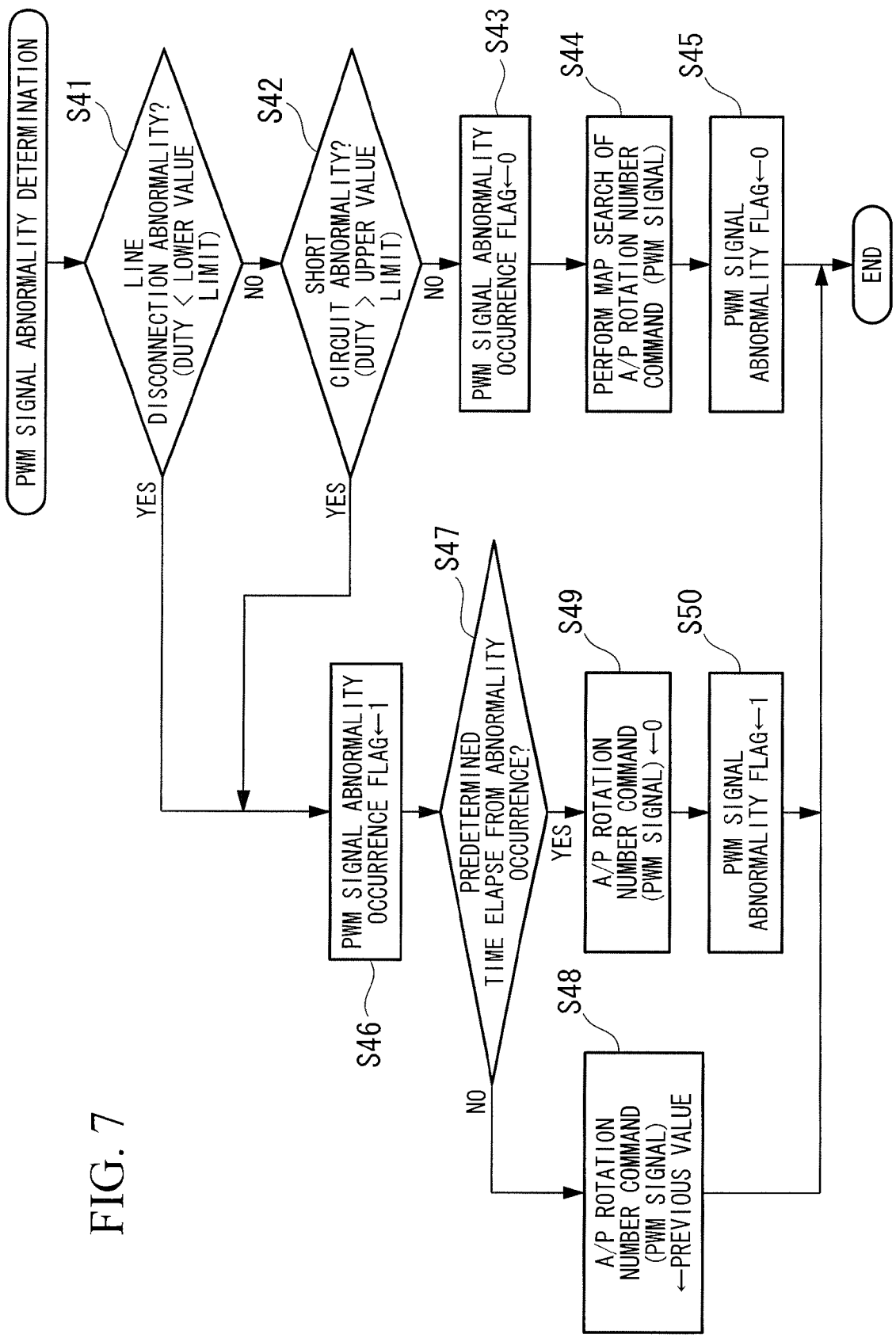
FIG. 7 is a flowchart illustrating a process of determining a PWM signal abnormality according to the embodiment.

First, in Step S41 shown in FIG. 7, for example, it is determined whether or not line disconnection abnormality occurs by determining whether the duty of the PWM signal associated with the A/P rotation number command (PWM signal) is less than a predetermined lower value limit.

When the determination result is "YES", the process proceeds to Step S46 described below.

Alternatively, when the determination result is "NO", the process proceeds to Step S42.

In Step S42, it is determined whether or not short circuit abnormality occurs by determining whether the duty of the PWM signal associated with the A/P rotation number command (PWM signal), for example, is greater than a predetermined upper limit.

When the determination result is "YES", the process proceeds to Step S46 described below.

Alternatively, when the determination result is "NO", the process proceeds to Step S43.

In Step S43, "0" is set to the flag value of the PWM signal abnormality occurrence flag representing that an abnormality occurs in the PWM signal associated with the A/P rotation number command (PWM signal) input through the PWM signal line 62, and the process proceeds to Step S44.

In Step S44, a new A/P rotation number command (PWM signal) is obtained by a map search of a predetermined map according to the duty of the PWM signal associated with the A/P rotation number command (PWM signal), for example, and then the process proceeds to Step S45.

Figure 8:
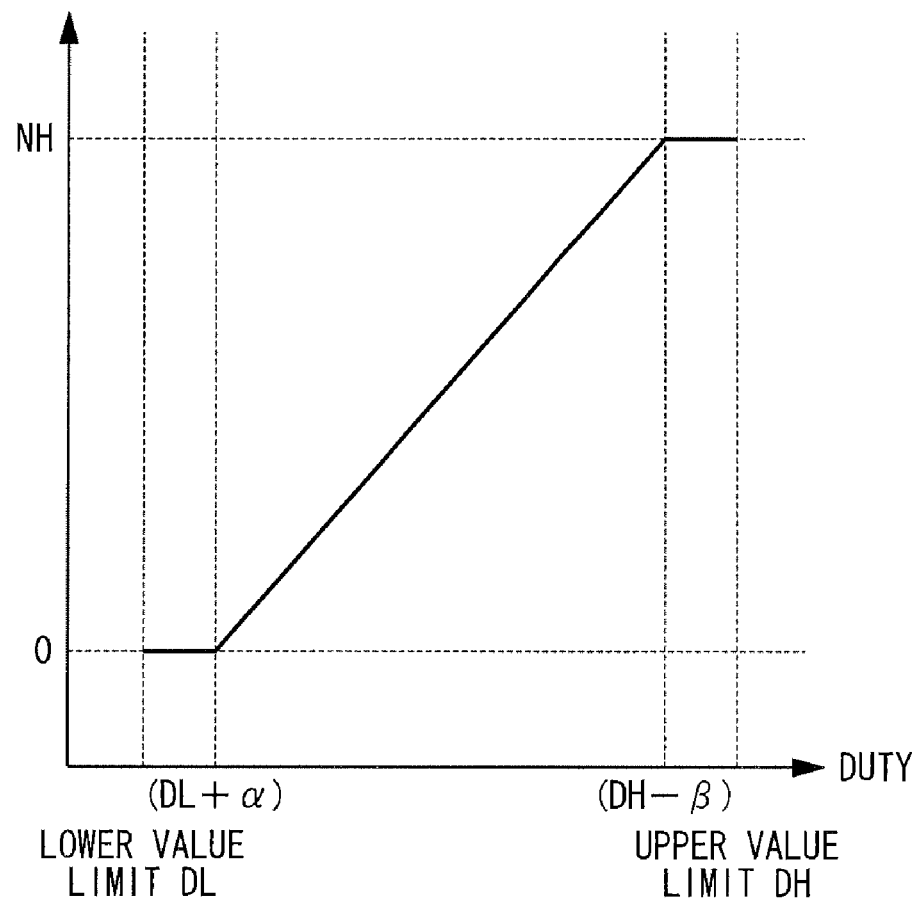
FIG. 8 is a graph illustrating a predetermined corresponding relationship between a duty of a PWM signal associated with an A/P rotation number command (PWM signal) and the A/P rotation number command according to the embodiment.

As shown in FIG. 8, for example, the predetermined map is a map representing a predetermined corresponding relationship between the duty and the A/P rotation number command. For example, the A/P rotation number command is set to zero, when the duty is in the range from a predetermined lower value limit DL to a predetermined value (DL+α). As the duty increases from the predetermined value (DL+α) to a predetermined value (DH−β), the A/P rotation number command varies so as to increase to a predetermined upper rotation number command NH. In addition, the A/P rotation number command is set to the upper limit rotation number command NH in the range of the duty from the predetermined value (DH−β) to the upper limit rotation number command DH.

In Step S45, "0" is set to the flag value of the PWM signal abnormality flag representing that the PWM signal line 62 is abnormal, and the series of processes ends.

Subsequently, in Step S46, "1" is set to the flag value of the PWM signal abnormality occurrence flag.

In Step S47, it is determined whether or not a predetermined amount of time elapses from the line disconnection abnormality or the short circuit abnormality in a state where the abnormality continues.

When the determination result is "YES", the process proceeds to Step S49 described below.

Alternatively, when the determination result is "NO", the process proceeds to Step S48.

In Step S48, the previous value of the A/P rotation number command (PWM signal) obtained from the PWM signal received from the integration (corporation) control ECU 21 through the PWM signal line 62 in the previous process is set as a new A/P rotation number command (PWM signal), and then the series of processes ends.

Subsequently, in Step S49, zero is set to the A/P rotation number command (CAN reception value) and the process proceeds to Step S50.

In Step S50, "1" is set to the flag value of the PWM signal abnormality flag and the series of processes ends.

Hereinafter, the switching process will be described.

Figure 9:
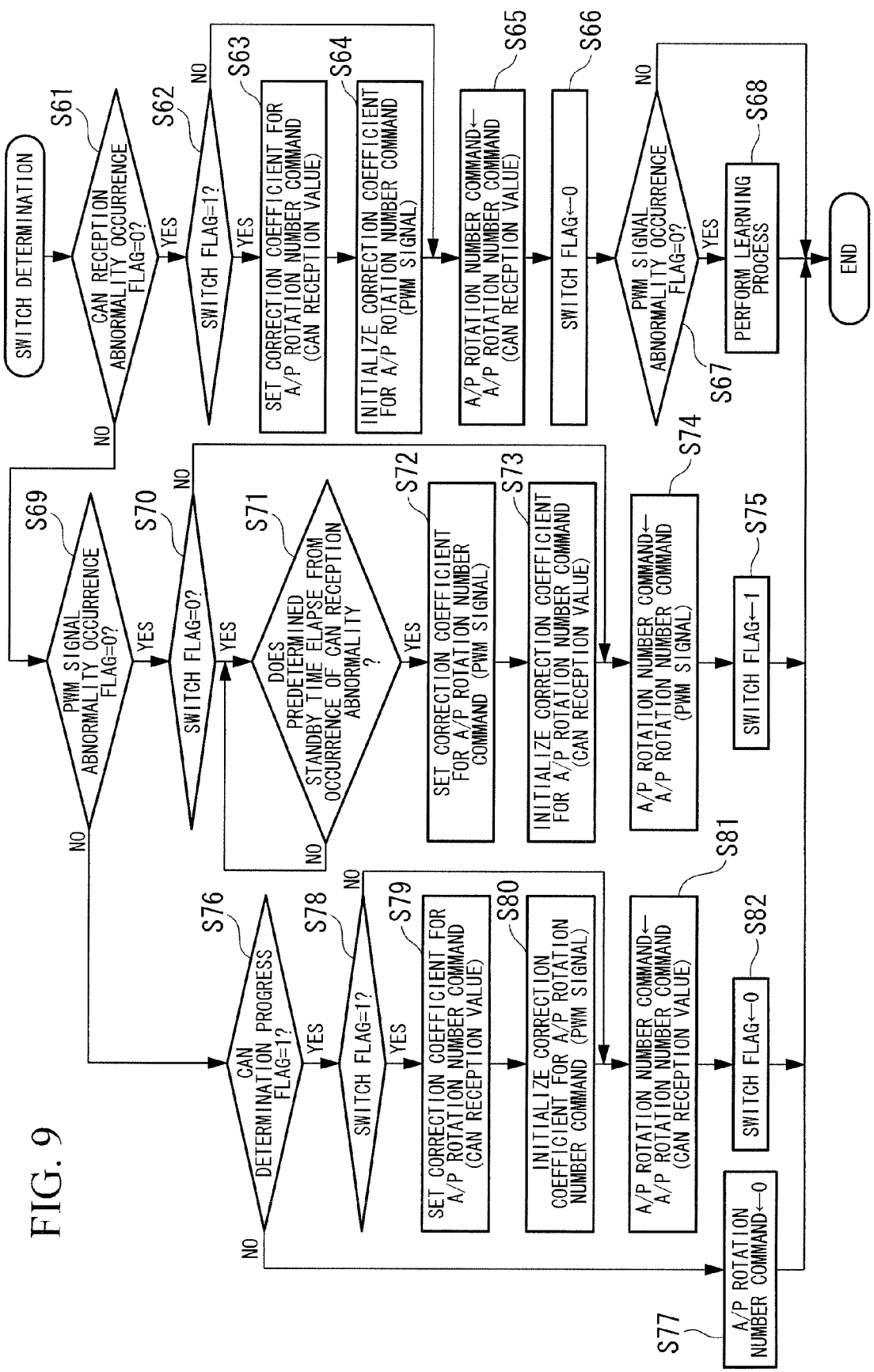
FIG. 9 is a flowchart illustrating a switch determination process according to the embodiment.

First, in Step S61 shown in FIG. 9, for example, it is determined whether or not the flag value of the CAN reception abnormality occurrence flag is "0".

When the determination result is "NO", the process proceeds to Step S69.

Alternatively, when the determination result is "YES", the process proceeds to Step S62.

In Step S62, it is determined whether or not the flag value of a switch flag representing that switch from the A/P rotation number command (CAN reception value) to the A/P rotation number command (PWM signal) is performed in the switch processor 86 is "1".

When the determination result is "NO", the process proceeds to Step S65.

Alternatively, when the determination result is "YES", the process proceeds to Step S63.

In Step S63, the correction coefficient for the A/P rotation number command (CAN reception value) is set, and then the process proceeds to Step S64.

The correction coefficient is set in accordance with data of a difference between the A/P rotation number command (CAN reception value) and the A/P rotation number command (PWM signal) stored immediately before the present process in the control command value storage unit 85. For example, the correction coefficient is set as a difference average value or the like which is based on the difference between the A/P rotation number command (CAN reception value) and the A/P rotation number command (PWM signal) in every predetermined plural rotation number in the rotation number of the air pump (A/P) 14.

Subsequently, in Step S64, in order to perform initialization, the correction coefficient for the A/P rotation number command (PWM signal) is set to zero, and the process proceeds to Step S65.

In Step S65, the A/P rotation number command (CAN reception value) subjected to the correction by use of the correction coefficient is set as the A/P rotation number command, and the process proceeds to Step S66.

In Step S66, "0" is set to the flag value of the switch flag, and then the process proceeds to Step S67.

In Step S67, it is determined whether or not the flag value of the PWM signal abnormality occurrence flag is "0".

When the determination result is "NO", the series of processes ends.

Alternatively, when the determination result is "YES", the process proceeds to Step S68.

In Step S68, as a learning process, the difference between the present value of the A/P rotation number command (CAN reception value) and the present value of the A/P rotation number command (PWM signal) is stored in the control command value storage unit 85, and then the series of processes ends.

Subsequently, in Step S69, it is determined whether or not the flag value of the PWM signal abnormality occurrence flag is "0".

When the determination result is "NO", the process proceeds to Step S76 described below.

Alternatively, when the determination result is "YES", the process proceeds to Step S70.

In Step S70, it is determined whether or not the flag value of the switch flag is "0".

When the determination result is "NO", the process proceeds to Step S74 described below.

Alternatively, when the determination result is "YES", the process proceeds to Step S71.

In Step S71, it is determined whether or not a predetermined standby time elapsed after the CAN reception abnormality occurs.

When the determination result is "NO", the determination process of Step S71 is repeatedly performed.

Alternatively, when the determination result is "YES", the process proceeds to Step S72.

In Step S72, the correction coefficient for the A/P rotation number command (PWM signal) is set, and then the process proceeds to Step S73.

The correction coefficient is set in accordance with data of the difference between the A/P rotation number command (CAN reception value) and the A/P rotation number command (PWM signal) stored immediately before the present process in the control command value storage unit 85. For example, the correction coefficient is set as a difference average value or the like which is based on the difference between the A/P rotation number command (CAN reception value) and the A/P rotation number command (PWM signal) in every predetermined plural rotation number in the rotation number of the air pump (A/P) 14.

Subsequently, in Step S73, in order to perform initialization, the correction coefficient for the A/P rotation number command (CAN reception value) is set to zero, and the process proceeds to Step S74.

In Step S74, the A/P rotation number command (PWM signal) subjected to the correction by use of the correction coefficient is set as the A/P rotation number command, and the process proceeds to Step S75.

In Step S75, "1" is set to the flag value of the switch flag and the series of processes ends.

Subsequently, in Step S76, it is determined whether or not the flag value of the CAN determination progress flag is "1".

When the determination result is "NO", the process proceeds to Step S77. In Step S77, zero is set as the A/P rotation number command and the series of processes ends.

Alternatively, when the determination result is "YES", the process proceeds to Step S78.

In step S78, it is determined whether or not the flag value of the switch flag is "1".

When the determination result is "NO", the process proceeds to Step S81 described below.

Alternatively, when the determination result is "YES", the process proceeds to Step S79.

In Step S79, the correction coefficient for the A/P rotation number command (CAN reception value) is set and the process proceeds to Step S80.

The correction coefficient is set in accordance with data of a difference between the A/P rotation number command (CAN reception value) and the A/P rotation number command (PWM signal) stored immediately before the present process in the control command value storage unit 85. For example, the correction coefficient is set as a difference average value or the like which is based on the difference between the A/P rotation number command (CAN reception value) and the A/P rotation number command (PWM signal) in every predetermined plural rotation number in the rotation number of the air pump (A/P) 14.

Subsequently, in Step S80, in order to perform initialization, the correction coefficient for the A/P rotation number command (PWM signal) is set to zero and the process proceeds to Step S81.

In Step S81, the A/P rotation number command (CAN reception value) for the correction coefficient is set as the A/P rotation number command and the process proceeds to S82.

In Step S82, "0" is set to the flag value of the switch flag and the series of processes ends.

As described above, a corresponding relationship between each flag value of the CAN reception abnormality flag, the CAN determination progress flag, and the PWM signal abnormality flag and the A/P rotation number command (AP-PDU control value) is described in Table 1, for example.

TABLE 1

| FLAG | FLAG | S/C ROTATION NUMBER COMMAND |
|---|---|---|
| CAN RECEPTION ABNORMALITY FLAG = 0 | PWM SIGNAL ABNORMALITY FLAG = 0 | (CAN RECEPTION VALUE) |
| CAN RECEPTION ABNORMALITY FLAG = 0 | PWM SIGNAL ABNORMALITY FLAG = 1 | (CAN RECEPTION VALUE) |
| CAN DETERMINATION PROGRESS FLAG = 1 | PWM SIGNAL ABNORMALITY FLAG = 0 | (PWM SIGNAL) |
| CAN DETERMINATION PROGRESS FLAG = 1 | PWM SIGNAL ABNORMALITY FLAG = 1 | (CAN RECEPTION VALUE) |
| CAN RECEPTION ABNORMALITY FLAG = 1 | PWM SIGNAL ABNORMALITY FLAG = 0 | (PWM SIGNAL) |
| CAN RECEPTION ABNORMALITY FLAG = 1 | PWM SIGNAL ABNORMALITY FLAG = 1 | ZERO |

Figure 10:
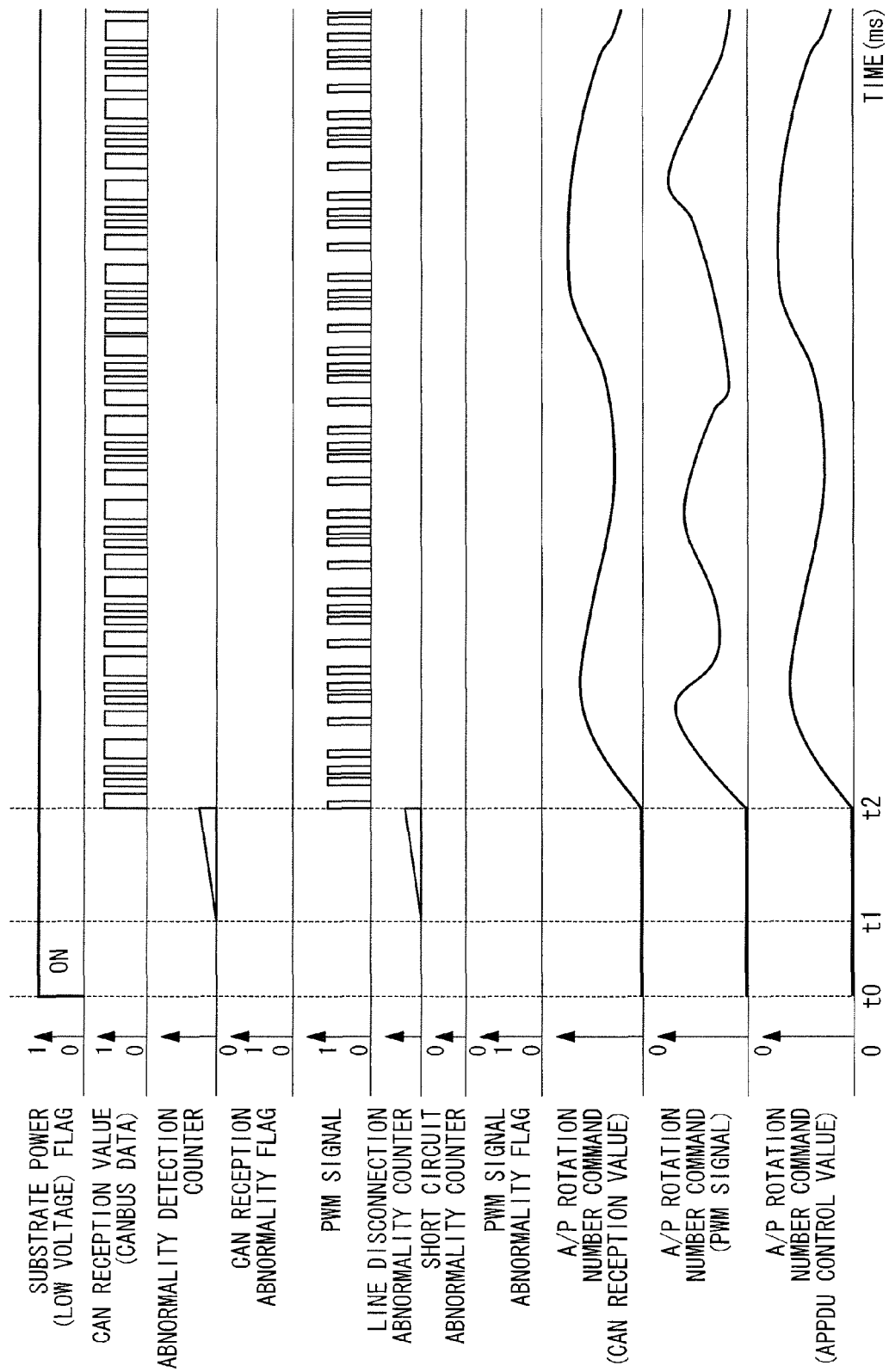
FIG. 10 is a graph illustrating an example of time variation in CANBUS data associated with an A/P rotation number command (CAN reception value), the PWM signal associated with the A/P rotation number command (PWM signal), flag values of various flags, counter values of various counters, the A/P rotation number command (CAN reception value), the A/P rotation number command (PWM signal), and the A/P rotation number command (APPDU control value) according to the embodiment.

As shown in FIG. 10, for example, a time at which a flag value of a substrate power (low voltage system) flag is converted from "0" to "1" by power activation in which the control device 1a is turned on at the time of starting the fuel cell vehicle 1 is time t0 and a period in which a predetermined amount of time elapses from time t0 to time t1 is a preparation period. During the preparation period, "0" is set to the flag values of the CAN reception abnormality flag and the PWM signal abnormality flag. In addition, zero is set to the A/P rotation number command (CAN reception value) and the A/P rotation number command (PWM signal).

A time at which each of a counter value of an abnormality detection counter which represents elapsed time of reception abnormality and a counter value of a line disconnection abnormality counter which represents elapsed time of line disconnection abnormality is less than a predetermined standby time from time t1 is time t2, for example. At time t2, the A/P rotation number command (CAN reception value) and the A/P rotation number command (PWM signal) vary from zero so as to increase in association with occurrence of the CANBUS data and the PWM signal. In amount of time subsequent to time t2, when each of the flag values of the CAN reception abnormality flag and the PWM signal abnormality flag is "0" and abnormality does not occurs in the CAN communication line 61 and the PWM signal line 62, the A/P rotation number command (CAN reception value) is selected in the switch processor 86 and the A/P rotation number command (CAN reception value) is set as the A/P rotation number command (APPDU control value).

Figure 11:
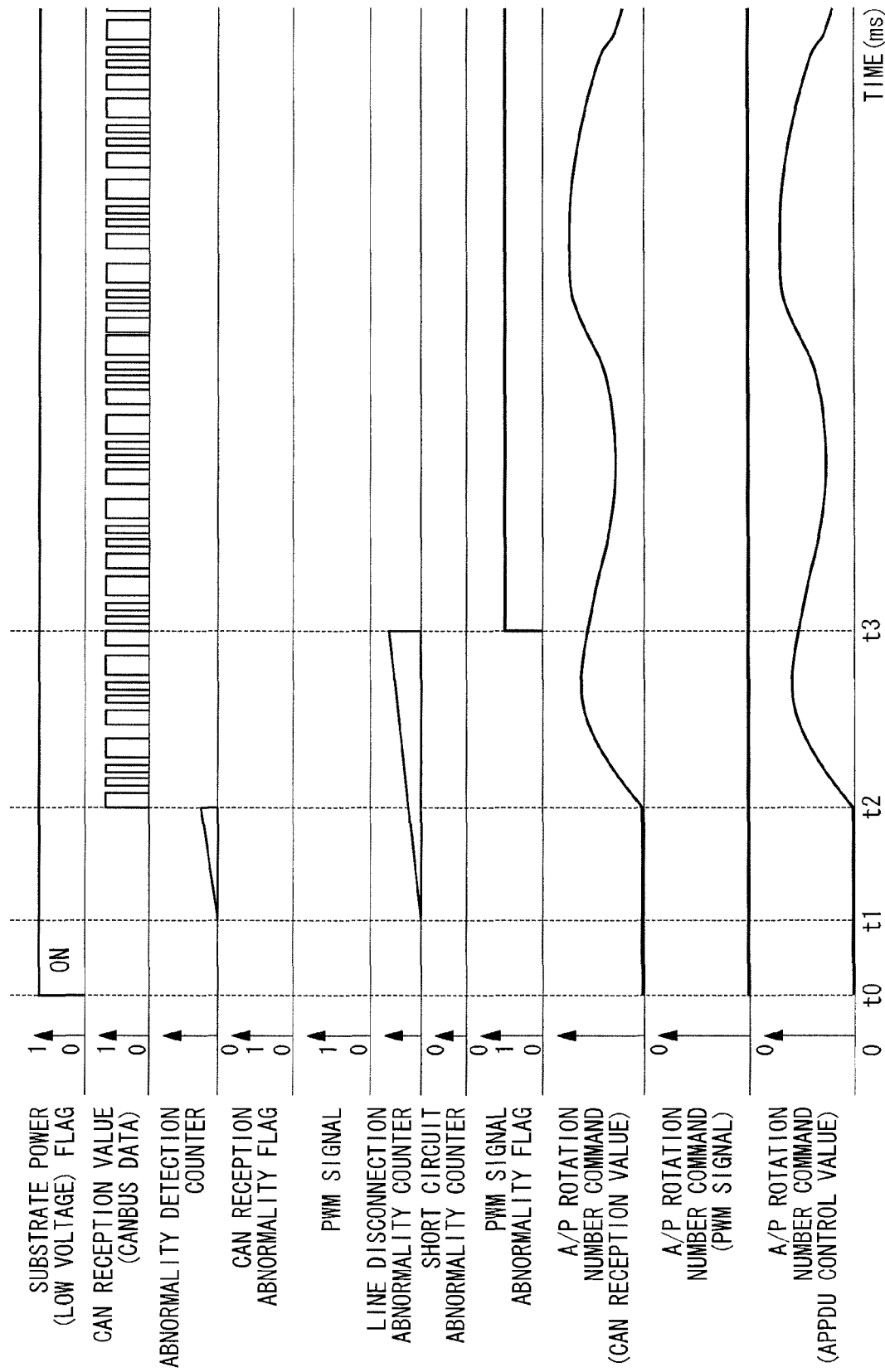
FIG. 11 is a graph illustrating an example of time variation in CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 11, for example, time at which the counter value of the abnormality detection counter is less than a predetermined standby time, for example, and the A/P rotation number command (CAN reception value) varies from zero so as to increase with occurrence of the CANBUS data is time t2. In amount of time subsequent to time t2, when the flag value of the CAN reception abnormality flag is "0" and an abnormality does not occur in the CAN communication line 61, the counter value of the line disconnection abnormality counter reach at time t3 which is a predetermined time, for example, and thus the flag value of the PWM signal abnormality flag becomes "1" such as amount of time subsequent to time t3. Then, it is determined that an abnormality occurs in the PWM signal line 62. In addition, even when the A/P rotation number command (PWM signal) becomes zero, the A/P rotation number command (CAN reception value) is selected in the switch processor 86. Then, the A/P rotation number command (CAN reception value) is set as the A/P rotation number command (APPDU control value).

Figure 12:
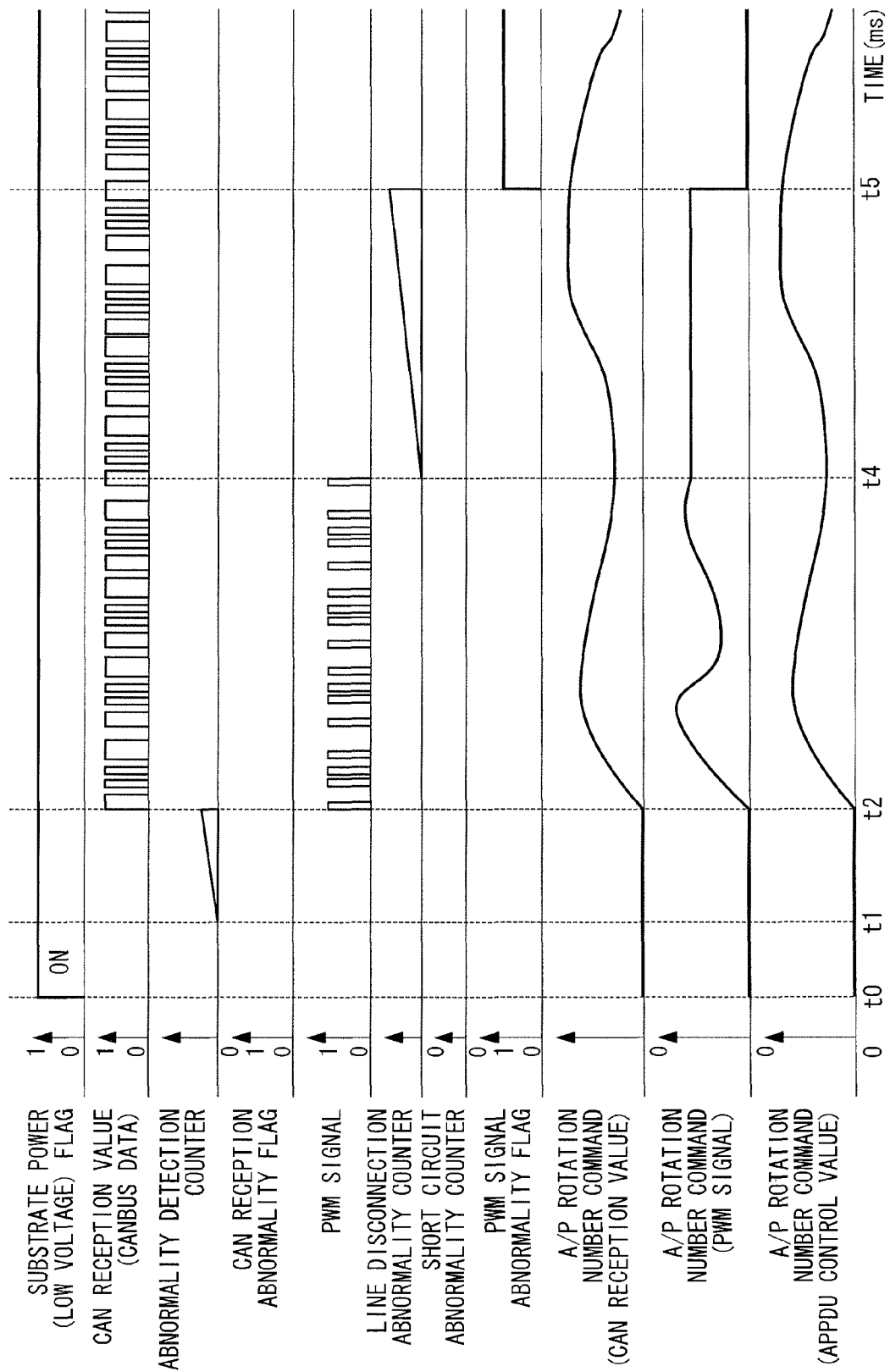
FIG. 12 is a graph illustrating an example of time variation in CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 12, for example, a time at which the A/P rotation number command (CAN reception value) is selected in the switch processor 86 is time t2 and a time at which the counter value of the line disconnection abnormality counter varies so as to increase in association with no occurrence of an abnormality in the CAN communication line 61 and the PWM signal line 62 in the time subsequent to t2 is time t4. Then, in amount of time subsequent to time t4, the A/P rotation number command (PWM signal) is maintained with a value (that is, the value at the previous time) immediately before time t4.

In addition, when the counter value of the line disconnection abnormality counter reaches at time t5 which is a predetermined time and thus the flag value of the PWM signal abnormality flag becomes "1" such as amount of time subsequent to time t5, it is determined that an abnormality occurs in the PWM signal line 62. In this case, zero is set to the A/P rotation number command (PWM signal).

Figure 13:
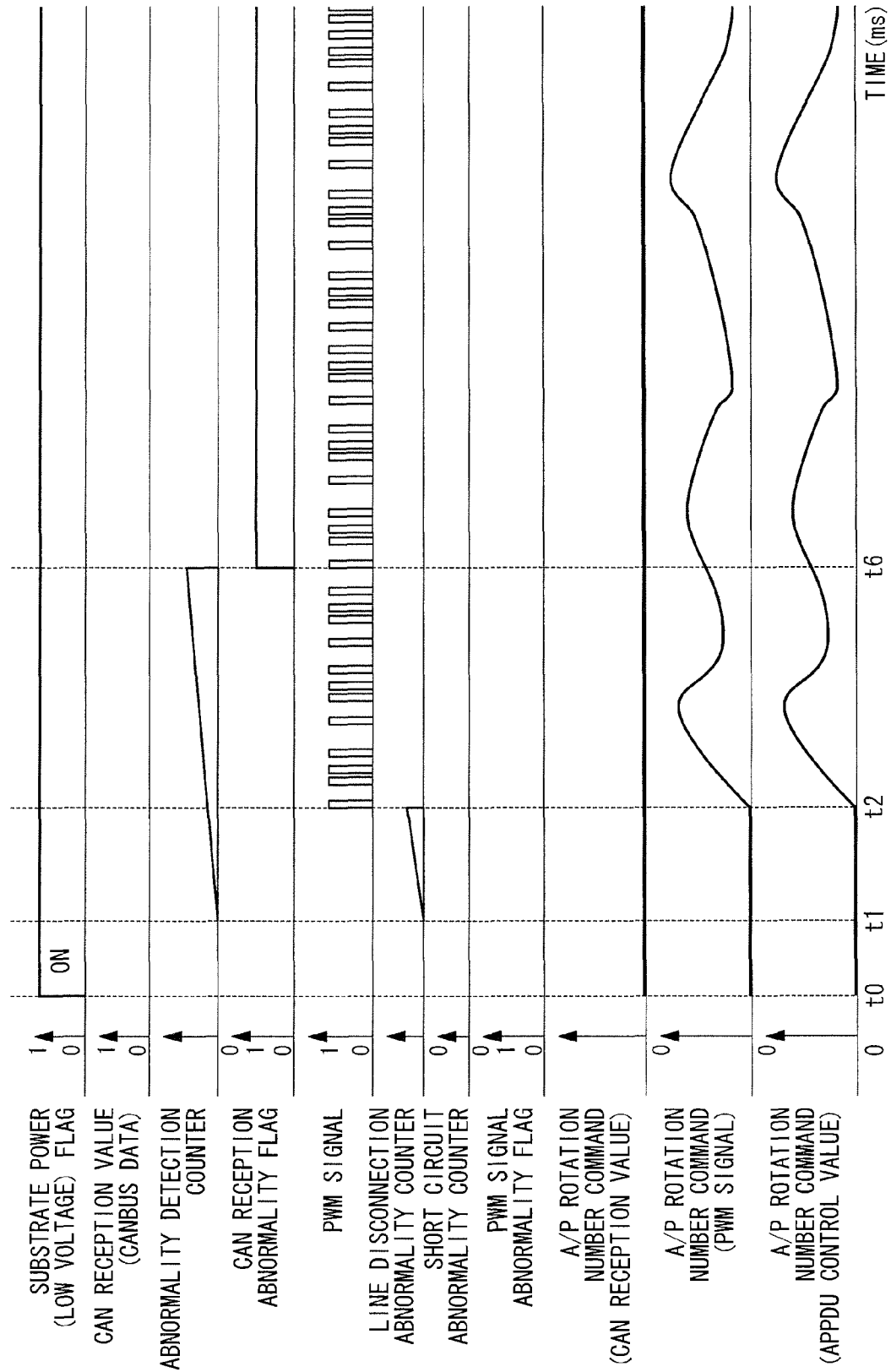
FIG. 13 is a graph illustrating an example of time variation in CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 13, for example, the counter value of the line disconnection abnormality counter is less than a predetermined standby time, a time at which the A/P rotation number command (PWM signal) varies from zero so as to increase in association with generation of the PWM signal is time t2, the flag value of the PWM signal abnormality flag is "0" in amount of time subsequent to time t2, and no abnormality occurs in the PWM signal line 62. In this case, when a time at which the counter value of the abnormality detection counter reaches at predetermined time is time t6, for example, and the flag value of the CAN reception abnormality flag becomes "1" after time t6, it is determined that an abnormality occurs in the CAN communication line 61. In addition, when the A/P rotation number command (CAN reception value) becomes zero, the A/P rotation number command (PWM signal) is selected in the switch processor 86 and the A/P rotation number command (PWM signal) is set as the A/P rotation number command (APPDU control value).

Figure 14:
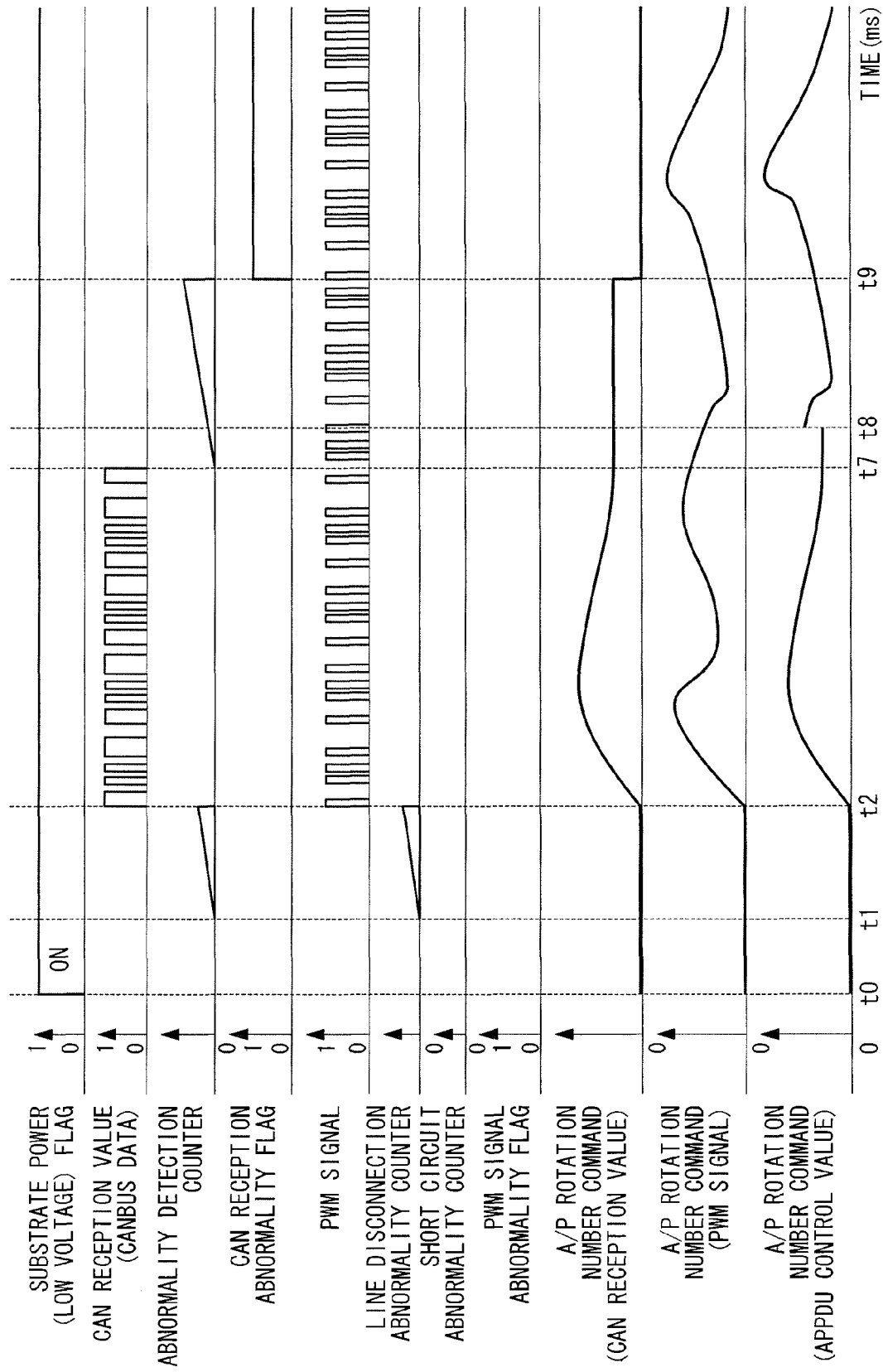
FIG. 14 is a graph illustrating an example of time variation in CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 14, for example, a time at which the A/P rotation number command (CAN reception value) is selected in the switch processor 86 in association with no occurrence of an abnormality in the CAN communication line 61 and the PWM signal line 62 is time t2, a time at which the counter value of the abnormality detection counter is time t7, for example, in amount of time subsequent to time t7, the A/P rotation number command (CAN reception value) is maintained with a value (that is, the value at the previous time) immediately before time t7. Accordingly, like the A/P rotation number command (CAN reception value), the A/P rotation number command (APPDU control value) is maintained with a value (that is, the value at the previous time) immediately before time t7.

In addition, when the counter value of the abnormality detection counter continues to increase in amount of time subsequent to time t8, which is a time at which the counter value of the abnormality detection counter reaches at the predetermined standby time, for example, the A/P rotation number command (CAN reception value) is switched to the A/P rotation number command (PWM signal) in the switch processor 86, so that the A/P rotation number command (PWM signal) is set as the A/P rotation number command (APPDU control value), even though the flag value of the CAN reception abnormality flag is "0".

Subsequently, when the counter value of the abnormality detection counter reaches at predetermined time and thus the flag value of the CAN reception abnormality flag becomes "1" such as amount of time subsequent to time t9, it is determined that an abnormality occurs in the CAN communication line 61. Then, zero is set to the A/P rotation number command (CAN reception value).

Figure 15:
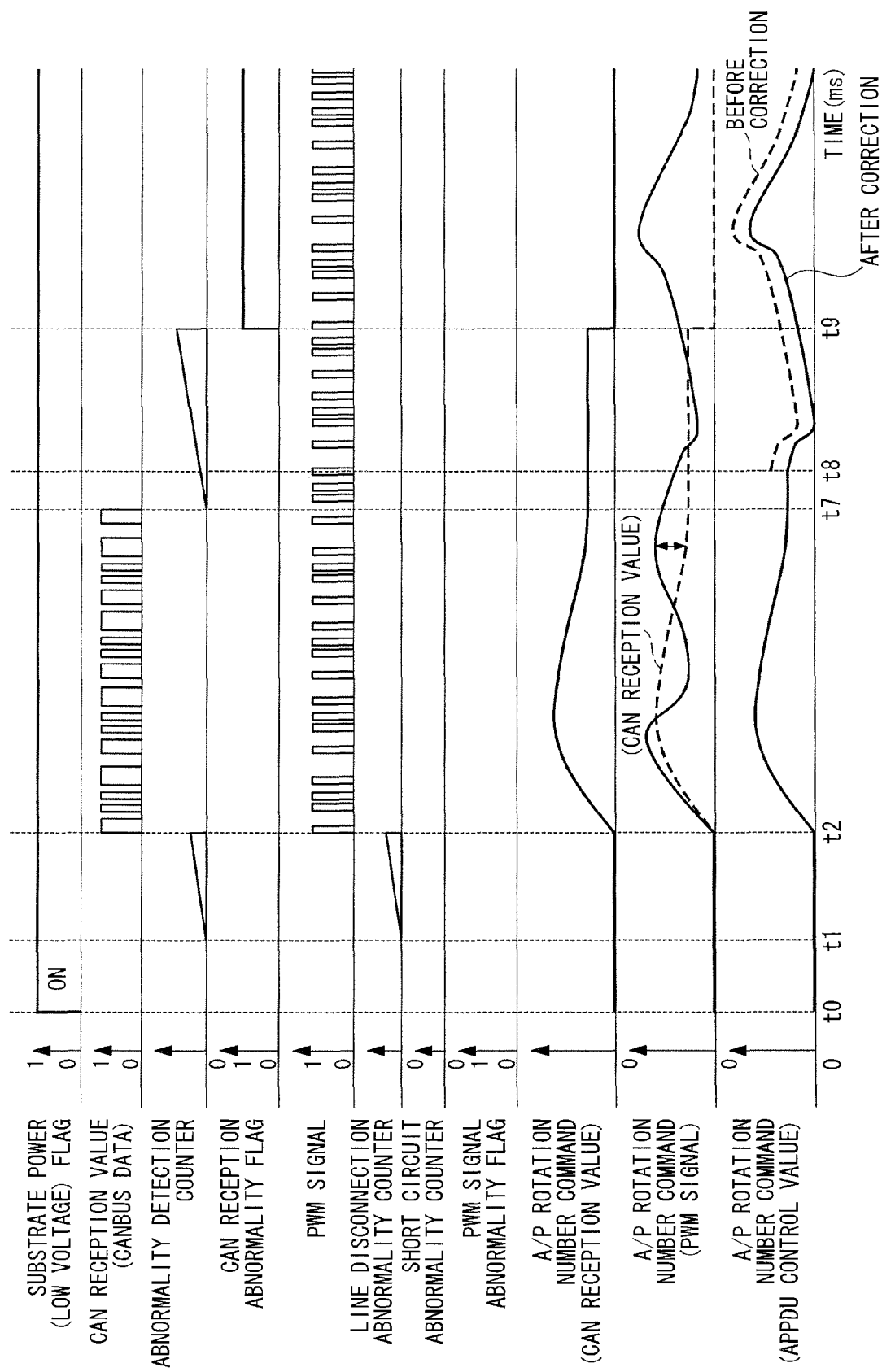
FIG. 15 is a graph illustrating an example of time variation in CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 15, for example, when a time at which the A/P rotation number command (CAN reception value) is selected in the switch processor 86 in association with no occurrence of an abnormality in the CAN communication line 61 and the PWM signal line 62 is time t2, a time at which the counter value of the abnormality detection counter varies so as to increase in amount of time subsequent to time t2 is time t7. In addition, in amount of time subsequent to time t7, the A/P rotation number command (CAN reception value) is maintained with a value (that is, the value at the previous time) obtained immediately before time t7. Accordingly, like the A/P rotation number command (CAN reception value), the A/P rotation number command (APPDU control value) is maintained with a value (that is, the value at the previous time) immediately before time t7.

In addition, when the counter value of the abnormality detection counter continues to increase in amount of time subsequent to time t8 at which the counter value of the abnormality detection counter reaches at the predetermined standby time, for example, the A/P rotation number command (CAN reception value) is switched to the A/P rotation number command (PWM signal) in the switch processor 86, so that the A/P rotation number command (PWM signal) is set as the A/P rotation number command (APPDU control value), even though the flag value of the CAN reception abnormality flag is "0". At this time, the A/P rotation number command (PWM signal) set as the A/P rotation number command (APPDU control value) is corrected by use of the correction coefficient according to the data of the difference between the A/P rotation number command (CAN reception value) and the A/P rotation number command (PWM signal) stored in the control command value storage unit 85. In addition, the switch is smoothly performed by allowing the A/P rotation number command (APPDU control value) so as not to vary abruptly, at time t8 at which the A/P rotation number command (APPDU control value) is switched from the A/P rotation number command (CAN reception value) to the A/P rotation number command (PWM signal).

Figure 16:
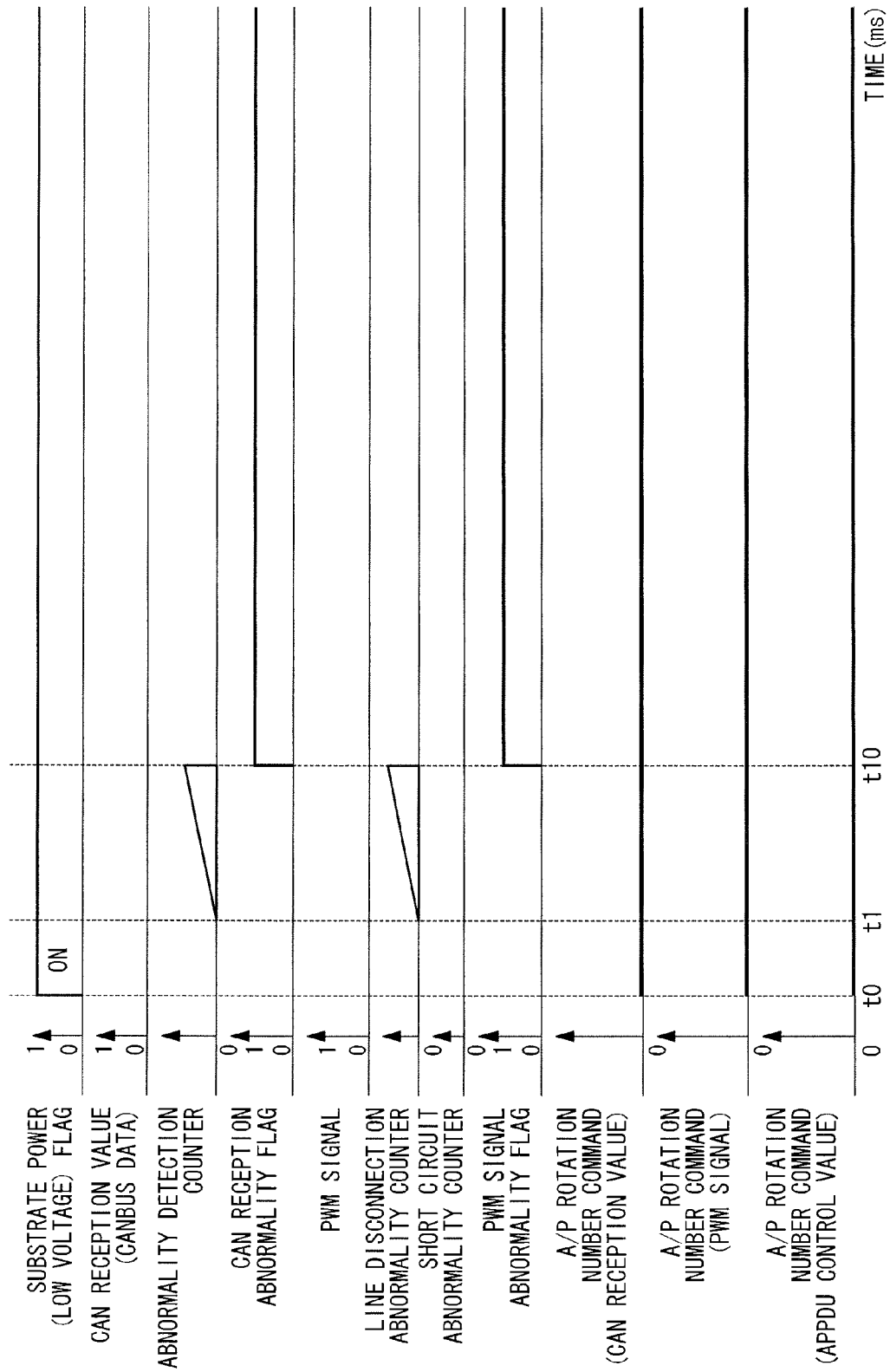
FIG. 16 is a graph illustrating an example of time variation in
CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 16, for example, when a time at which the counter value of the abnormality detection counter and the counter value of the line disconnection abnormality counter reaches at predetermined time in amount of time subsequent to time t1 at which the so-called preparation period ends is time t10, for example, and the flag value of the CAN reception abnormality flag and the flag value of the PWM signal abnormality flag becomes "1" such as amount of time subsequent to time t10, it is determined that an abnormality occurs in the CAN communication line 61 and the PWM signal line 62. In addition, when the A/P rotation number command (CAN reception value) and the A/P rotation number command (PWM signal) become zero, zero is set to the A/P rotation number command (APPDU control value).

Figure 17:
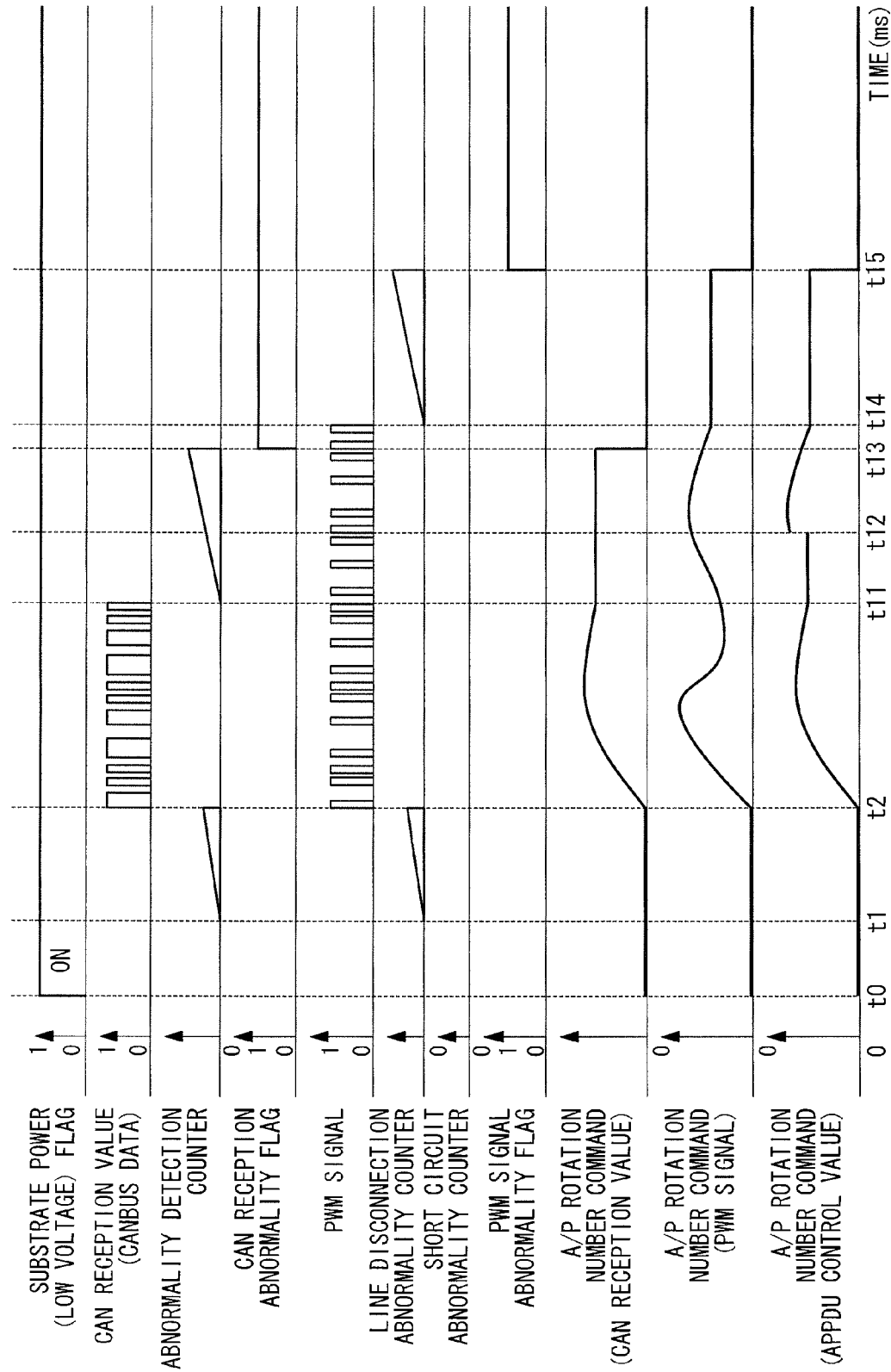
FIG. 17 is a graph illustrating an example of time variation in CANBUS data associated with the A/P rotation number command (CAN reception value), the PWM signal associated with the A/P rotation number command (PWM signal), the flag values of the various flags, the counter values of the various counters, the A/P rotation number command (CAN reception value), the A/P rotation number command (PWM signal), and the A/P rotation number command (APPDU control value) according to the embodiment.

As shown in FIG. 17, for example, time at which the A/P rotation number command (CAN reception value) is selected in the switch processor 86 in association with no occurrence of an abnormality in the CAN communication line 61 and the PWM signal line 62 is time t2. In addition, in amount of time subsequent to time t11, for example, at which the counter value of the abnormality detection counter varies so as to increase in amount of time subsequent to time t2, the A/P rotation number command (CAN reception value) is maintained with a value (that is, the value at the previous time) immediately before time t11. Accordingly, like the A/P rotation number command (CAN reception value), the A/P rotation number command (APPDU control value) is maintained with a value (that is, the value at the previous time) immediately before time t11.

In addition, when the counter value of the abnormality detection counter continues to increase, time at which the counter value of the abnormality detection counter reaches at predetermined standby time is time t12 and the A/P rotation number command (CAN reception value) is switched to the A/P rotation number command (PWM signal) in amount of time subsequent to time t12 in the switch processor 86, so that the A/P rotation number command (PWM signal) is set as the A/P rotation number command (APPDU control value), even though the flag value of the CAN reception abnormality flag is "0".

When the counter value of the abnormality detection counter reaches at predetermined time, the flag value of the CAN reception abnormality flag becomes "1" such as amount of time subsequent to time t13. At this time, when it is determined that an abnormality occurs in the CAN communication line 61, zero is set to the A/P rotation number command (CAN reception value).

Moreover, the A/P rotation number command (PWM signal) is maintained with a value (that is, the value at the previous time) immediately before time t14 in amount of time subsequent to time t14 at which the counter value of the line disconnection abnormality counter varies so as to increase, for example. Accordingly, like the A/P rotation number command (PWM signal), the A/P rotation number command (APPDU control value) is maintained with a value (that is, the value at the previous time) immediately before time t14.

When the counter value of the abnormality detection counter reaches at predetermined time, the flag value of the PWM signal abnormality flag becomes "1" such as amount of time subsequent to time t15. At this time, when it is determined that an abnormality occurs in the PWM signal line 62, zero is set to the A/P rotation number command (PWM signal). Accordingly, zero is set to the A/P rotation number command (APPDU control value).

According to the redundant communication system 10 in this embodiment, as described above, it is possible to switch the A/P rotation number command (APPDU control value) from the A/P rotation number command (CAN reception value) to the A/P rotation number command (PWM signal) from time at which the flag value of the CAN reception abnormality occurrence flag representing that an abnormality occurs in receiving the CANBUS data associated with the A/P rotation number command (CAN reception value) input through the CAN communication line 61 is switched from "0" to "1", that is, time at which it can be determined that an abnormality occurs in the CAN communication line 61, even at time prior to time at which it is determined that an abnormality actually occurs in the CAN communication line 61. Moreover, it is possible to properly control the air pump (A/P) 14 in accordance with the control command value calculated by the integration (corporation) control ECU 21, even during execution of the process of determining whether an abnormality occurs in the CAN communication line 61.

The flag value of the CAN reception abnormality occurrence flag is switched from "1" to "0" to cancel reception abnormality, even when the A/P rotation number command (APPDU control value) is switched from the A/P rotation number command (CAN reception value) to the A/P rotation number command (PWM signal) in association with a possibility of determining that an abnormality occurs in the CAN communication line 61. Accordingly, the possibility of determining that the abnormality occurs in the CAN communication line 61 dissolves. In this case, by again switching the A/P rotation number command (APPDU control value) from the A/P rotation number command (PWM signal) to the A/P rotation number command (CAN reception value), it is possible to improve precision in controlling the air pump (A/P) 14 thanks to the CAN communication line 61, which is better in a communication throughput and a communication rate than the PWM signal line 62, for example.

The A/P rotation number command (CAN reception value) is maintained with the value (that is, the value at the previous time) immediately before the time at which the flag value of the CAN reception abnormality occurrence flag is switched from "0" to "1", that is, the time at which a possibility of determining that an abnormality occurs in the CAN communication line 61 occurs, when the A/P rotation number command (CAN reception value) is set as the A/P rotation number command (APPDU control value). With such a configuration, it is possible to continue proper control of the air pump (A/P) 14 without using the control command value in which there is a possibility that an abnormality occurs, during the period in which the A/P rotation number command (APPDU control value) is switched from the A/P rotation number command (CAN reception value) to the A/P rotation number command (PWM signal).

Moreover, it is possible to correct the A/P rotation number command (CAN reception value) and the A/P rotation number command (PWM signal) so as to be the same one another, for example, even when a difference between the A/P rotation number command (CAN reception value) and the A/P rotation number command (PWM signal) is present. With such a configuration, it is possible to smoothly switch the A/P rotation number command (APPDU control value) before and after the switch between the A/P rotation number command (CAN reception value) and the A/P rotation number command (PWM signal). Accordingly, abrupt variation in the control of the air pump (A/P) 14 can be prevented.

Since the integration (corporation) control ECU 21 and the air supply control ECU 22 are connected to each other through the CAN communication line 61 and the PWM signal line 62 which are different from each other in the communication protocol, it is possible to properly control the air pump (A/P) 14, while improving a complementary property in communication between the integration (corporation) control ECU 21 and the air supply control ECU 22, compared to a case where the integration (corporation) control ECU 21 and the air supply control ECU 22 are connected to each other through the same communication lines.

In the PWM signal receiver 83 according to this embodiment, the PWM signal is transmitted through the noise filter unit 83a, the Schmitt trigger 83e, and the low-pass filter 83f in sequence. With such a configuration, the PWM signal having reduced noise and high precision can be input to the low-pass filter 83f. Accordingly, in the low-pass filter 83f, the PWM signal can be properly converted and output. In this way, it is possible to properly control the air pump (A/P) 14 on the basis of the PWM signal.

By providing both the common mode filter 83b and the transistor 83c in the noise filter unit 83a, it is possible to transmit the PWM signal having high precision, since both the common mode noise and the normal mode noise can be precisely suppressed.

By providing the photo-coupler 83d, it is possible to precisely convert the voltage of the PWM signal and further reduce noise.

By providing the transistor 83c to an input-side of the photo-coupler 83d, it is possible to prevent breakdown of the photo-coupler 83d. For example, with a configuration having no transistor 83c, a problem may occur in that the photo-coupler 83d is broken down and the PWM signal cannot be transmitted when a relatively large noise is input. However, by providing the transistor 83c, it is possible to prevent this problem. Accordingly, since the PWM signal is precisely transmitted to the PWM signal input processor 84, it is possible to prevent occurrence of an abnormality in the PWM signal.

In the embodiment described above, the common mode filter 83b, the transistor 83c, the photo-coupler 83d, the Schmitt trigger 83e, the low-pass filter 83f, and the buffer amplifier 83g are disposed in sequence from a side of the control command value calculator 71 to a side of the PWM signal input processor 84, but the invention is not limited thereto. For example, a disposition order of the common mode filter 83b and the transistor 83c on a side of inputting the PWM signal may be changed.

Moreover, the photo-coupler 83d may be provided to an output-side of the buffer amplifier 83e (that is, between the buffer amplifier 83e and the PWM signal input processor 84), instead of providing the photo-coupler 83d between the noise filter unit 83a and the Schmitt trigger 83e.

In the embodiment described above, the redundant communication system 10 is equipped in the fuel cell vehicle 1, but the invention is not limited thereto. For example, the redundant communication system 10 may be equipped in a hybrid vehicle or the like.

Moreover, in the embodiment described above, the redundant communication system 10 is configured to have the integration (corporation) control ECU 21 and the air supply control ECU 22, but the invention is not limited thereto. Instead of the air supply control ECU 22, another control ECU may be provided. In addition, the invention is not limited to the motor driving the air pump (A/P) 14, but a control command value for another power device may be switched and selected.

INDUSTRIAL APPLICABILITY

In the redundant communication system according to the present invention, it is possible to properly control the power device equipped in a vehicle, even when an abnormality occurs in a communication system of the vehicle.

The invention claimed is:
1. A redundant communication system comprising:
a first control device which calculates a control command value of an electric power device equipped in a vehicle, and outputs a first command signal and a second command signal respectively corresponding to the control command value;

a second control device which controls the electric power device on the basis of one of a first control command value and a second control command value respectively corresponding to the first command signal and the second command signal received from the first control device;

a primary communication line which connects the first control device and the second control device, and transmits the first command signal from the first control device to the second control device; and a secondary communication line which connects the first control device and the second control device, and transmits the second command signal from the first control device to the second control device, wherein communications through the primary communication line and the secondary communication line are carried out in different communication protocols, and wherein the second control device comprises:

a primary communication line abnormality determining unit which determines that the primary communication line is abnormal, when a non-reception state of the first command signal or an abnormality state of the first command signal continues during a predetermined period; and a control command value switching unit which selects one of the first control command value and the second control command value in a switching manner, and wherein the control command value switching unit switches the selection from the first control command value to the second control command value within the predetermined period from a start time at which the non-reception state of the first command signal or the abnormality state of the first command signal starts until a time at which the primary communication line abnormality determining unit determines that the primary communication line is abnormal.

2. The redundant communication system according to claim 1, wherein
the control command value switching unit switching the selection from the second control command value to the first control command value, when the non-reception state of the first command signal or the abnormality state of the first command signal is dissolved after switching from the first control command value to the second control command value and before elapse of the predetermined period.

3. The redundant communication system according to claim 1, wherein
the second control device controls the electric power device on the basis of the first control command value selected immediately before the start time at which the non-reception state of the first command signal or the abnormality state of the first command signal starts, from the start time until the time at which the control command value switching unit switches the selection from the first control command value to the second control command value.

4. The redundant communication system according to claim 1, wherein the second control device further includes:
a storage unit which stores a difference between the first control command value and the second control command value; and
a correction unit which corrects the control command value selected between the first control command value and the second control command value by switching of the control command value switching unit, on the basis of the difference stored in the storage unit.

5. The redundant communication system according to claim 1, wherein
the second control command value is a PWM signal,
the second control device includes a noise filter unit reducing noise of the PWM signal, a Schmitt trigger, and a low-pass filter disposed between the first control device and the control command value switching unit, and
the PWM signal is transmitted from the first control device to the noise filter, the Schmitt trigger, and the low-pass filter in sequence.

6. The redundant communication system according to claim 5, wherein the noise filter unit includes a common mode filter and a transistor.

7. The redundant communication system according to claim 5, wherein the second control device includes a photocoupler disposed between the noise filer unit and the Schmitt trigger.

8. The redundant communication system according to claim 5, wherein the second control device includes a buffer amplifier disposed between the low-pass filter and the control command value switching unit.

* * * * *